United States Patent
Wong et al.

(10) Patent No.: US 12,349,111 B2
(45) Date of Patent: Jul. 1, 2025

(54) COMMUNICATIONS DEVICE, INFRASTRUCTURE EQUIPMENT AND METHODS FOR HANDLING UPLINK COLLISIONS

(71) Applicant: Sony Group Corporation, Tokyo (JP)

(72) Inventors: Shin Horng Wong, Basingstoke (GB); Martin Warwick Beale, Basingstoke (GB); Kazuyuki Shimezawa, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 352 days.

(21) Appl. No.: 17/795,234

(22) PCT Filed: Feb. 15, 2021

(86) PCT No.: PCT/EP2021/053683
§ 371 (c)(1),
(2) Date: Jul. 26, 2022

(87) PCT Pub. No.: WO2021/165215
PCT Pub. Date: Aug. 26, 2021

(65) Prior Publication Data
US 2023/0089138 A1 Mar. 23, 2023

(30) Foreign Application Priority Data
Feb. 18, 2020 (EP) .................................... 20158109

(51) Int. Cl.
*H04W 72/02* (2009.01)
*H04W 72/0446* (2023.01)
*H04W 72/56* (2023.01)

(52) U.S. Cl.
CPC ....... *H04W 72/02* (2013.01); *H04W 72/0446* (2013.01); *H04W 72/56* (2023.01)

(58) Field of Classification Search
None
See application file for complete search history.

(56) References Cited

U.S. PATENT DOCUMENTS

2013/0301486 A1  11/2013  Kishiyama
2018/0352582 A1  12/2018  Yi et al.
(Continued)

FOREIGN PATENT DOCUMENTS

WO  WO-2012111805 A1 *  8/2012  ........... H04L 5/0007
WO  2021/165326 A1  8/2021

OTHER PUBLICATIONS

International Search Report and Written Opinion mailed on May 17, 2021, received for PCT Application PCT/EP2021/053683, filed on Feb. 15, 2021, 10 pages.
(Continued)

*Primary Examiner* — Christine T Duong
(74) *Attorney, Agent, or Firm* — XSENSUS LLP

(57) ABSTRACT

A method of operating a communications device in a wireless communications network, the method comprising: selecting first uplink communication resources for transmitting uplink data, selecting second downlink communication resources for receiving downlink data, detecting a collision whereby, in accordance with the capabilities of the communications device, the communications device cannot both transmit signals using the first uplink communication resources and receive and decode signals transmitted using the second downlink communication resources, in response to detecting the collision, determining whether the second downlink communication resources are associated with a priority which is higher than a priority associated with the first uplink communication resources, and if the second downlink communication resources are associated with a priority which is higher than the priority associated with the first uplink communication resources, receiving the down-
(Continued)

link data using the second downlink communication resources, and refraining from transmitting the uplink data using the first uplink communication resources.

19 Claims, 16 Drawing Sheets

(56) References Cited

U.S. PATENT DOCUMENTS

| | | | |
|---|---|---|---|
| 2021/0014791 A1* | 1/2021 | Freda | H04W 52/0216 |
| 2021/0105803 A1* | 4/2021 | Yang | H04L 27/2601 |
| 2023/0102738 A1* | 3/2023 | Zhao | H04W 72/569 |
| | | | 370/329 |

OTHER PUBLICATIONS

Ericsson, "New SID on support of reduced capability NR devices", 3GPP TSG RAN Meeting #86, RP-193238, Dec. 9-12, 2019, 5 pages.
3GPP, "Study on Scenarios and Requirements for Next Generation Access Technologies; (Release 15)", 3GPP TR 38.913 V15.0.0, Jun. 2018, pp. 1-39.
Holma et al., "LTE for UMTS OFDMA and SC-FDMA Based Radio Access", John Wiley & Sons, 2009, 232 pages.
Nokia et al., "Revised SID: Study on NR Industrial Internet of Things (IoT)", 3GPP TSG RAN meeting #81, RP-182090, Sep. 10-13, 2018, 5 pages.

* cited by examiner

COMMUNICATIONS DEVICE, INFRASTRUCTURE EQUIPMENT AND METHODS FOR HANDLING UPLINK COLLISIONS

CROSS-REFERENCE TO RELATED APPLICATIONS

The present application is based on PCT filing PCT/EP2021/053683, filed Feb. 15, 2021, which claims priority to EP 20158109.7, filed Feb. 18, 2020, the entire contents of each are incorporated herein by reference.

BACKGROUND

Field

The present disclosure relates to communications devices, infrastructure equipment and methods for transmitting or receiving data in a wireless communications network.

Description of Related Art

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to support efficiently communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

Systems incorporating NR technology are expected to support different services (or types of services), which may be characterised by different requirements for latency, data rate and/or reliability. For example, a target for the Enhanced Mobile Broadband (eMBB) service is to provide a reliability of 10% with a user plane latency of 4 ms and a target for the Ultra Reliable & Low Latency Communications (URLLC) services is to provide a reliability of $1\text{-}10^5$ (99.999%) or higher for one transmission of a 32 byte packet with a user plane latency of 1 ms [3]. In addition, systems may be expected to support further enhancements related to the Industrial Internet of Things (IIoT) in order to support services with new requirements of high availability, high reliability, low latency, and in some cases, high-accuracy positioning.

There is also a desire to provide low-cost user equipment for use in such networks. Cost of a user equipment may be reduced by limiting a number of antennas, limiting a transmit and/or receive bandwidth, and/or simplifying or omitting other hardware typically associated with a user equipment.

There is thus a need to provide user equipment having low complexity (see e.g. [4]) which is nevertheless able to deliver services provided in a wireless communications network, such as those described above.

SUMMARY

The present disclosure can help address or mitigate at least some of the issues discussed above.

Example embodiments of the present technique can provide a method of operating a communications device in a wireless communications network. The method comprises selecting first uplink communication resources of an uplink of a wireless access interface for transmitting uplink data to an infrastructure equipment of the wireless communications network, selecting second downlink communication resources of a downlink of the wireless access interface for receiving downlink data transmitted by the infrastructure equipment of the wireless communications network, detecting a collision whereby, in accordance with the capabilities of the communications device, the communications device cannot both transmit signals using the first uplink communication resources and receive and decode signals transmitted using the second downlink communication resources, in response to detecting the collision, determining whether the second downlink communication resources are associated with a priority which is higher than a priority associated with the first uplink communication resources, and if the second downlink communication resources are associated with a priority which is higher than the priority associated with the first uplink communication resources, receiving the downlink data using the second downlink communication resources, and refraining from transmitting the uplink data using the first uplink communication resources.

Embodiments can provide for a communications device which is able to operate in a frequency division duplex network whereby overlapping communication resources may be selected for transmission and reception of data.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
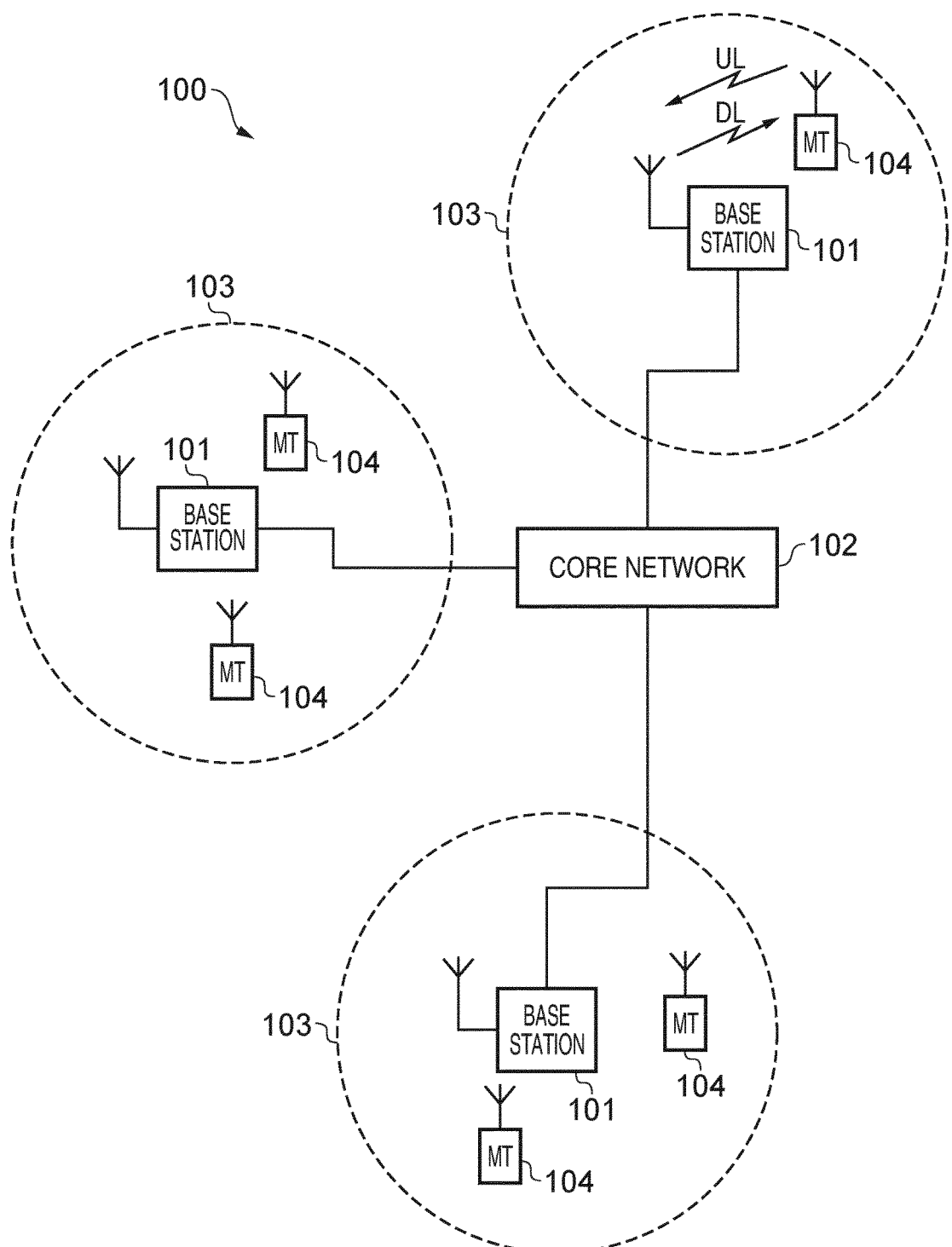
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
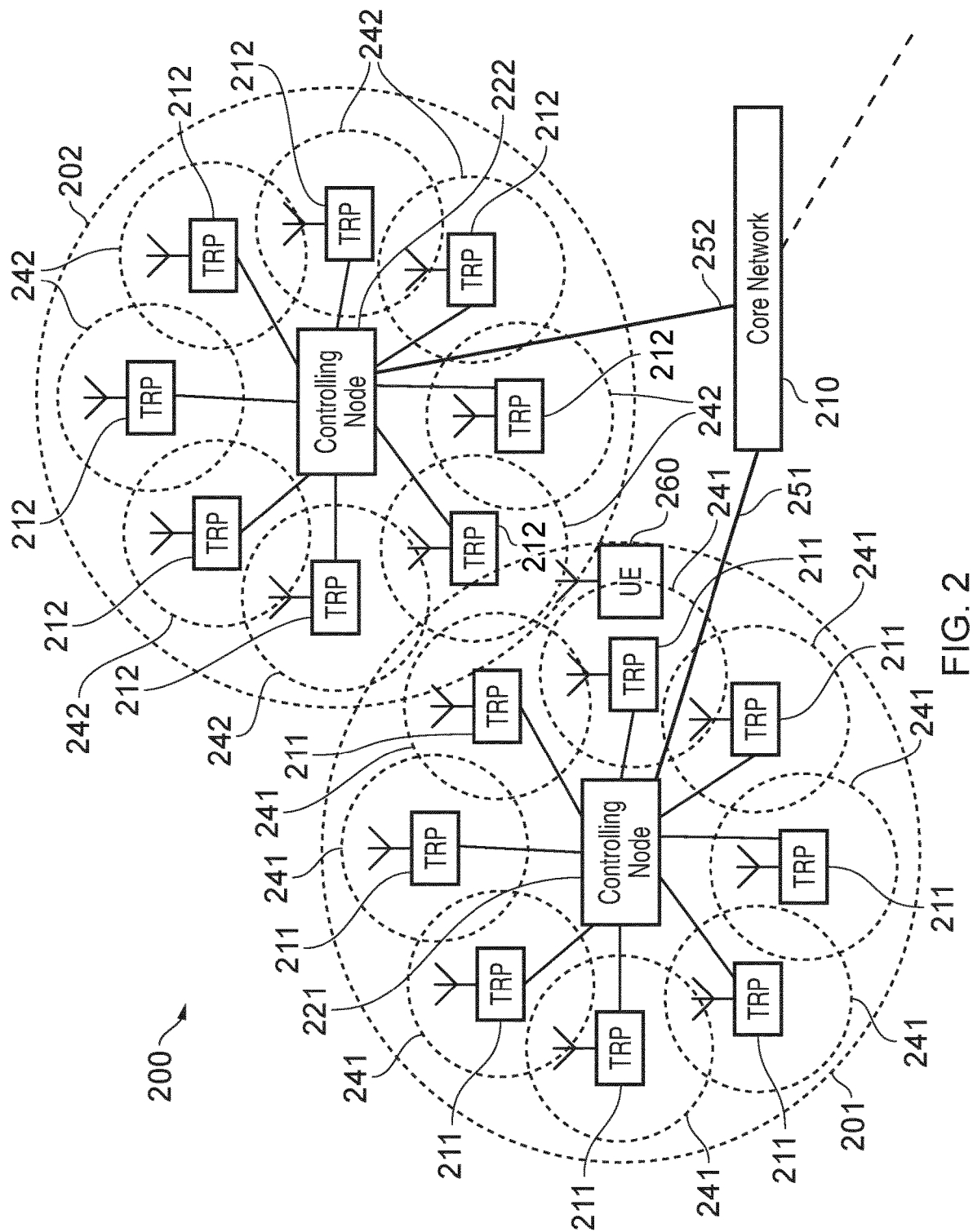
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/ remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated that in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated that the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand.

For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
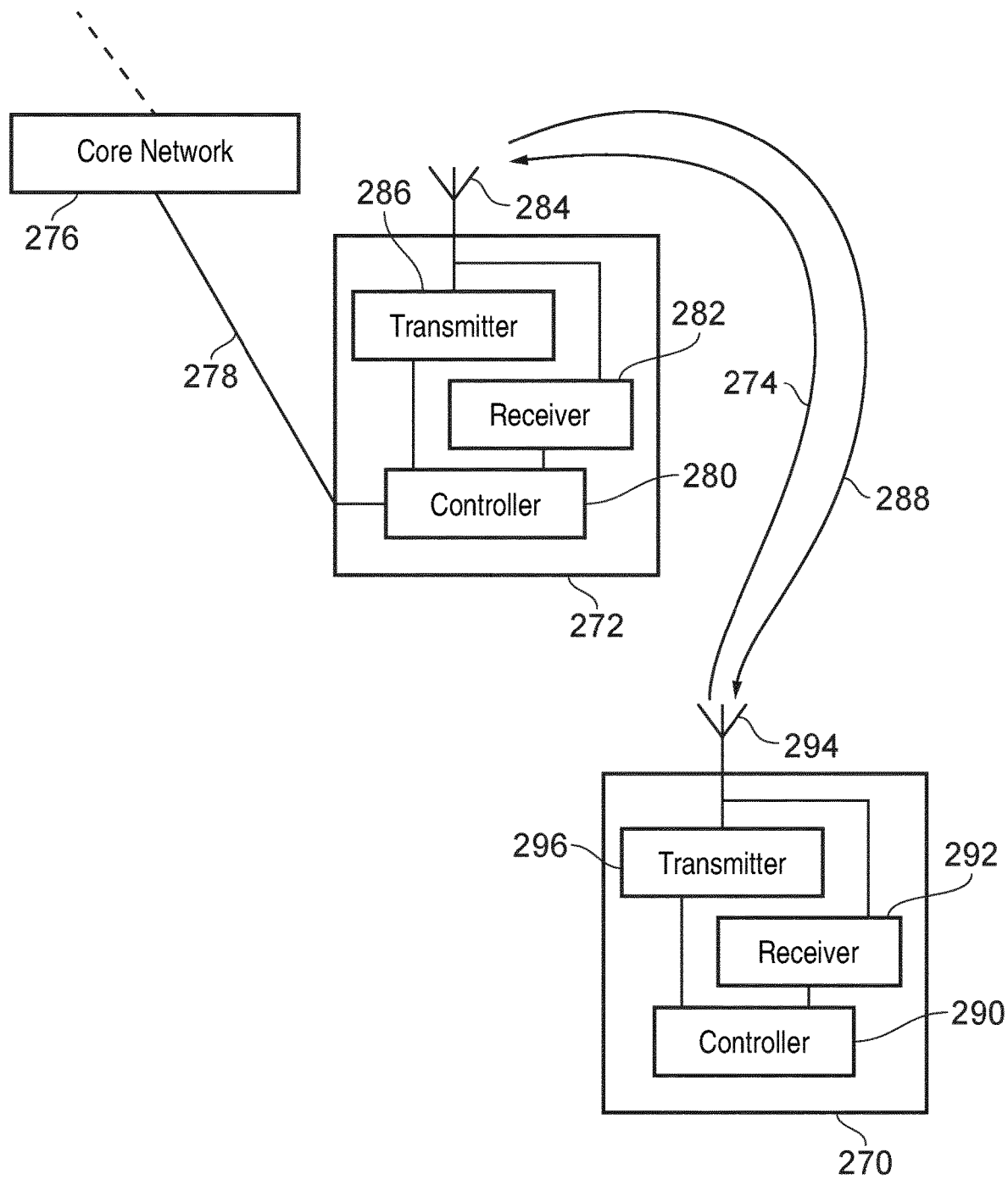
FIG. 3 is a schematic block diagram of an example infrastructure equipment and communications device which may be configured in accordance with example embodiments.

A more detailed illustration of a UE/communications device 270 (which may correspond to a communications device such as the communications device 260 of FIG. 2 or the communications device 104 of FIG. 1) and an example network infrastructure equipment 272, which may be thought of as a gNB 101 or a combination of a controlling node 221 and TRP 211, is presented in FIG. 3. As shown in FIG. 3, the UE 270 is shown to transmit uplink data to the infrastructure equipment 272 via uplink resources of a wireless access interface as illustrated generally by an arrow 274 from the UE 270 to the infrastructure equipment 272. The UE 270 may similarly be configured to receive downlink data transmitted by the infrastructure equipment 272 via downlink resources as indicated by an arrow 288 from the infrastructure equipment 272 to the UE 270. As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, the UE 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

Frequency Division Duplexing

Figure 4:
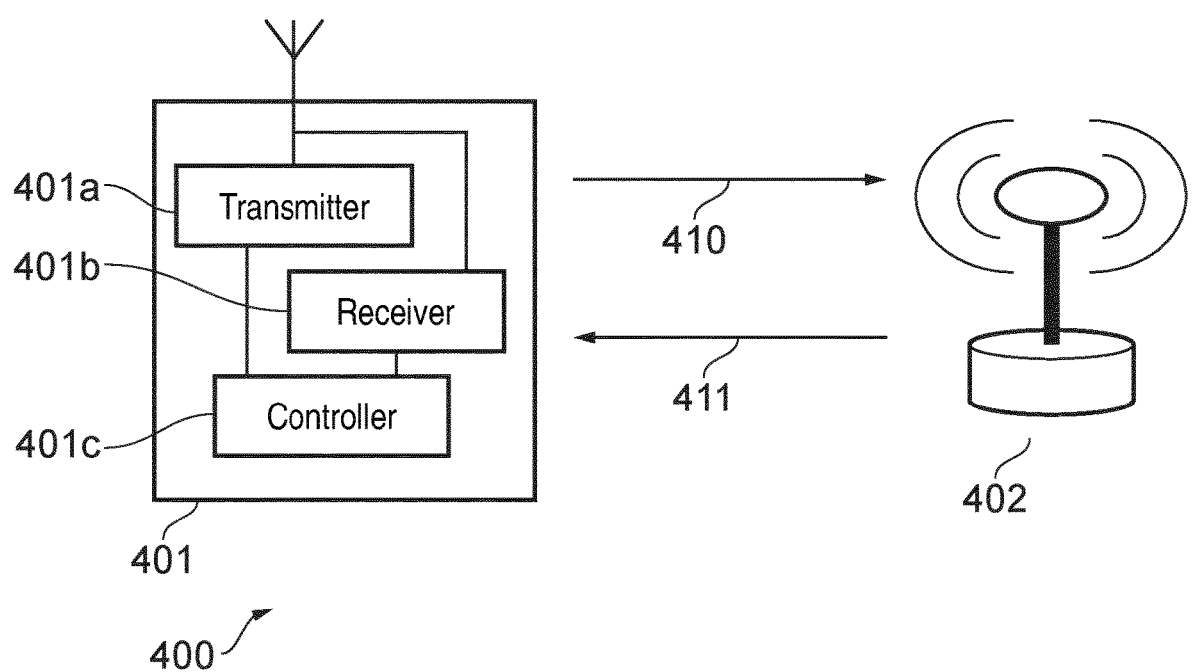
FIG. 4 illustrates full duplex communications in accordance with conventional techniques.

Duplex communications refers to the ability of a device to both transmit and receive data. For example, a communications device (such as the communications device 270 of FIG. 3) may communicate in a duplex manner with the infrastructure equipment 270 by transmitting signals 288 to the infrastructure equipment 272 and by receiving signals 274, transmitted by the infrastructure equipment 272. Duplex communications can either be full duplex (FD) or half-duplex (HD). FIG. 4 shows a system 400 comprising a communications device 401, configured with a transmitter 401a, a receiver 401b and a controller 401c, communicating in a full duplex manner with a gNB 402. Arrow 410 represents the transmission of data from the communications device 401 to the gNB 402. Arrow 411 represents the reception of data by the communications device 401 from the gNB 402. As illustrated in FIG. 4, the communications device 401 can both transmit 410 and receive 411 data to/from the gNB 402 simultaneously.

Figure 5:
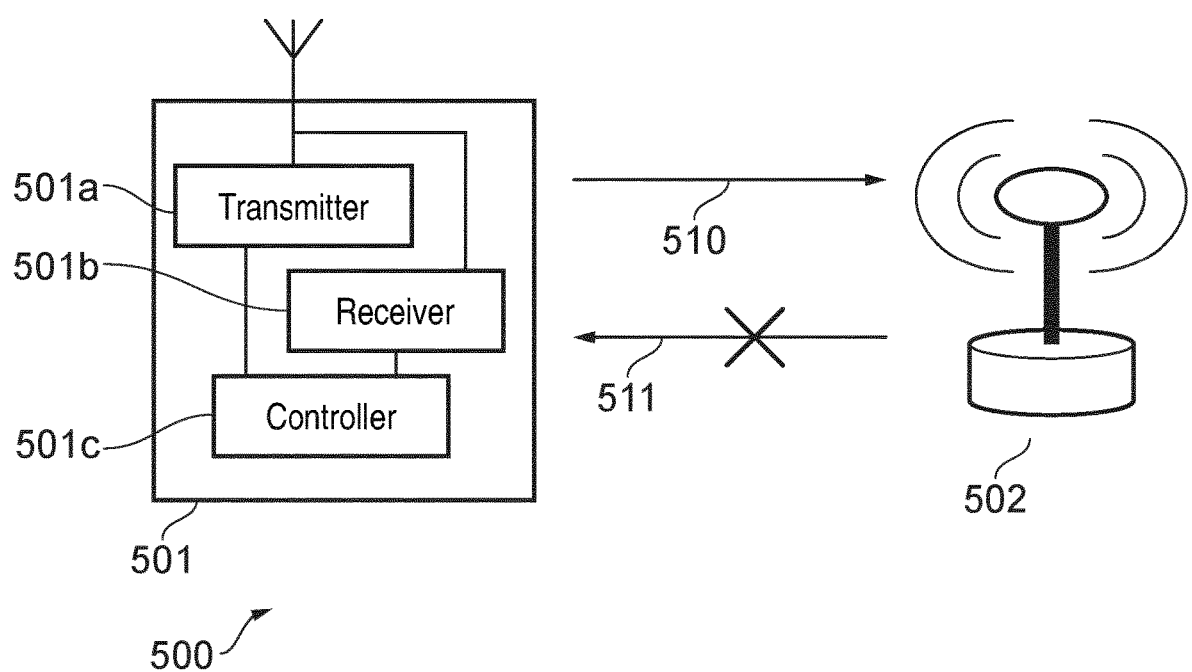
FIG. 5 illustrates half duplex communications in accordance with conventional techniques, which may be adapted in accordance with embodiments of the present disclosure.

By contrast, FIG. 5 illustrates half duplex communications. FIG. 5 shows a system comprising a communications device 501 configured with a transmitter 501a, a receiver 501b and a controller 501c communicating with a gNB 502. Arrow 510 represents the transmission of data from the communications device 501 to the gNB 502. Arrow 511 represents the reception of data by the communications device 501 from the gNB 502. As illustrated in FIG. 5, the communications device 501 cannot transmit 510 and receive 511 data simultaneously. In this case, data cannot be transmitted from the gNB 502 to the communications device 501 until the transmission of data from the communications device 501 to the gNB 502 has stopped.

Frequency Division Duplexing (FDD) is a known technique to allow duplex communication, whereby a transmitter and receiver within a device operate at different carrier frequencies. Accordingly, a transmitter of a communications device, for example, may transmit at one frequency while a receiver of the communications device receives at a different frequency. The transmission and reception frequencies are separated by a frequency offset. In other words, for FDD, a downlink and an uplink communication are operated in different frequency carriers (referred to as paired frequency carriers). Furthermore, Time Division Duplexing (TDD) is a known technique whereby the transmitter and receiver of a device operate at the same carrier frequency but the transmission and reception of signals are separated in time. In other words, for TDD, a downlink and an uplink communication are operated in the same frequency carrier (referred to as unpaired frequency carriers).

In accordance with some embodiments described herein, FDD may be implemented in a communications device which is capable of half duplex communications and which is not capable of full-duplex communications, such as the communications device 501 in FIG. 5. Such a communications device may be referred to as a Half-Duplex-Frequency-Division-Duplexing (HD-FDD) device. In HD-FDD, the communications device may be able to switch between transmission and reception independently of other communications devices in the same cell. By contrast, in some implementations of a TDD mode of operation, all communications devices in a cell must be synchronised i.e. a communications device is not permitted to transmit when one or more other communications device is receiving, and vice versa.

Figure 6:
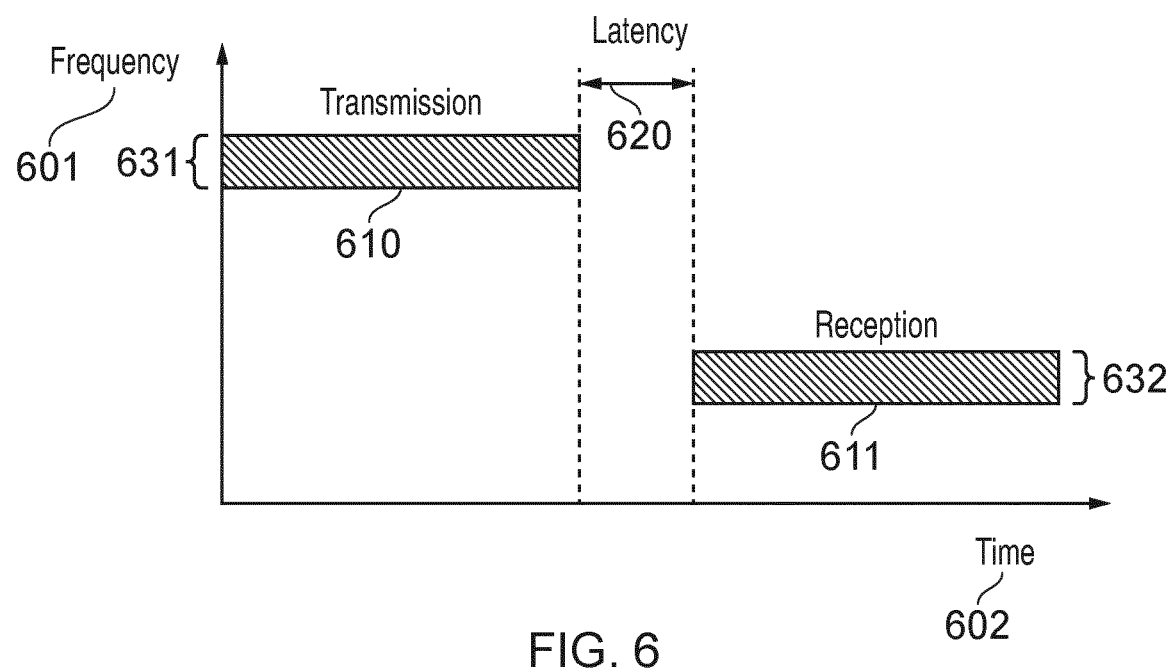
FIG. 6 shows an illustrative example of communication resources used by a half-duplex frequency division duplex (HD-FDD) device.

FIG. 6 shows an illustrative example of communication resources used by an HD-FDD device. In particular, FIG. 6 shows a representation of communication resources in a frequency domain 601 and a time domain 602. During a transmission period 610 a transmitter, such as the transmitter 501a of the communications device 501 in FIG. 5, transmits data in a first band of frequencies 631 to a device, such as the gNB 502 in FIG. 5. During a reception period 611 a receiver, such as the receiver 501b of the communications device 501 in FIG. 5, receives data from a device in a second band of frequencies 632, such as the gNB 502 in FIG. 5.

It will be appreciated by a person skilled in the art that the transmission 610 from the communications device 501 to the gNB 502 is an example of uplink transmission and the reception 611 by the communications device 501 from the gNB 502 is an example of downlink reception. It will also be appreciated that the communications device 501 could be a user equipment (UE).

In the example in FIG. 6, there is a switching period 620 (which may also be referred to as a transmission/reception switching period) between the transmission 610 and the reception 611. That is, there is a time delay between the transmission 631 and reception 611 of data. Generally therefore, compared with full duplex communication, additional latency in transmitting or receiving data can arise when using half duplex transmission because of the requirement to wait for any ongoing reception or transmission (respectively) to be completed and because of the switching period 620.

HD-FDD devices may be eMTC and/or NB-IoT communications devices (or may operate in accordance with eMTC or NB-IoT principles) whereby the latency requirements do not impose a stringent latency requirement, as discussed above. In such cases, the additional latency associated with half duplex operation may be acceptable for an HD-FDD communications device.

Some services in 5G NR require a low latency, such as URLLC, and the switching period 620 introduced by switching between transmission 610 and reception 602 in an HD-FDD device may have a significant impact on the service.

In a communication system, there may be a need for a communications device to both transmit and receive data. Where full duplex is possible, simultaneous uplink and downlink communication resources may be scheduled. However, if the communications device is half duplex, then it is necessary for the infrastructure equipment to avoid conflicts between uplink and downlink resources allocated to the same communications device, because transmission and reception cannot occur simultaneously in accordance with the half duplex capability of the communications device. A collision (referred to herein as an 'intra-UE HD-FDD collision) may arise when first communication resources are to be used for transmission by an HD-FDD communications device, and second communication resources are to be used for reception by the same communications device, wherein the first and second communication resources are such that the HD-FDD communications device is unable to use both communication resources. An intra-UE HD-FDD collision may arise because the first and second communication resources overlap (at least partially) in time and/or because the first and second communication resources are not separated in time by the minimum required switching time 620.

There may arise a case where communication resources are scheduled and allocated before the infrastructure equipment is aware of the need for a high priority/low latency transmission in the opposite direction. To avoid an intra-UE HD-FDD collision, the infrastructure equipment would not be able to allocated resources which conflict with the existing schedule, and it may therefore not be possible to meet latency requirements for the high priority/low latency transmission. In accordance with some embodiments of the present technique, the infrastructure equipment may schedule the high priority/low latency data in order to satisfy its latency requirements, thereby resulting in an intra-UE HD-FDD collision.

It has also been recognised that in some cases, communication resources may be wholly or partially autonomously selected by the communications device. For example, where predetermined communication resources are allocated (e.g. by means of semi-persistent scheduling, or for random access transmissions), the infrastructure equipment may not be aware of the selection of potentially conflicting communication resources by the communications device.

There may thus arise a possibility for an intra-UE HD-FDD collision, and there arises a technical problem of how to resolve such collisions.

Figure 7:
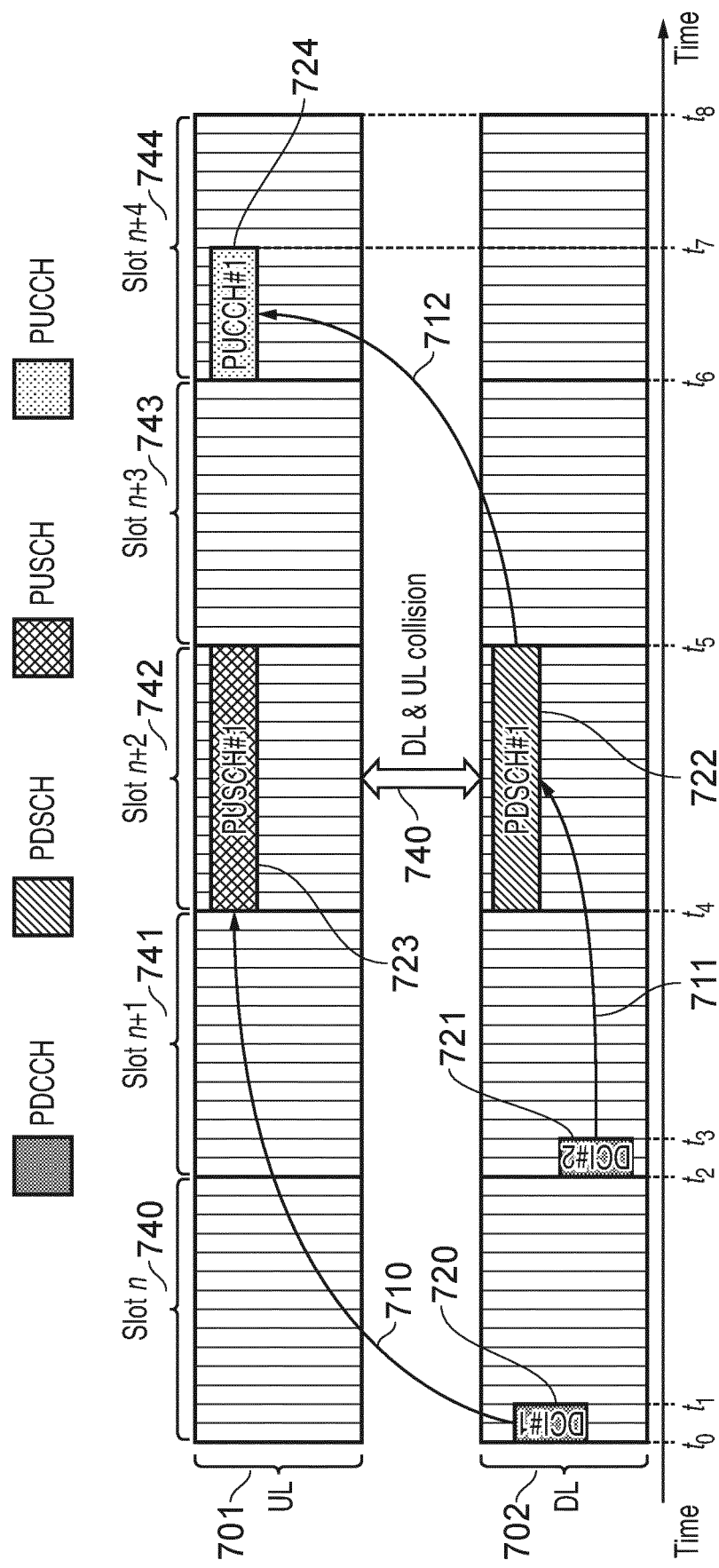
FIG. 7 shows an illustrative example of an intra-user equipment (UE) half duplex (HD) FDD collision between an uplink and a downlink transmission which may occur in an HD-FDD device.

FIG. 7 shows an illustrative example of an intra-UE HD-FDD collision between an uplink and a downlink transmission which may occur in a HD-FDD device. The device may be configured with a service having low latency requirements, such as URLLC. An example of a scenario to which FIG. 7 may be applicable is a user equipment attempting both uplink and downlink transmission with a wireless communications network.

FIG. 7 shows a first band of frequencies 701 configured for transmitting data to the wireless communications network. The communication resources within the first band of frequencies 701 are divided into time slots in the time domain. In FIG. 7, five separate time slots 740 to 744 associated with the first band of frequencies are shown. In this example, each time slot is divided into 14 time units. Each time unit may correspond to, for example, an OFDM symbol period. It will be appreciated that a different number of time units in a time slot, and a different number of time slots into which the first band of frequencies is divided can be configured.

FIG. 7 also shows a second band of frequencies 702 configured for receiving data from the wireless communications network. The second band of frequencies 702 is divided into time slots, which are aligned with the time slots 740, 741, 742, 743 and 744 used for the resources within the first band of frequencies 701. In this example, each time slot is divided into 14 time units. Each time unit may correspond to, for example, an OFDM symbol period. It will be appreciated that a different number of time units in a time slot, and a different number of time slots into which the second band of frequencies is divided can be configured.

In the illustrative example in FIG. 7, a wireless communication network provides to the user equipment, on the second band of frequencies 702 at a time t0, a first indication 720 of allocated communication resources to the user equipment. In the specific example, the first indication 720 is downlink control information (DCI). The first indication 720 schedules first communication resources 723 for a transmission of data by the user equipment to the wireless communications network from time t4 to t5, as shown by arrow 710. In the specific example, the first communication resources 723 occur on a Physical Uplink Shared Channel (PUSCH).

At a time t2, after time t1, the wireless communication network transmits to the user equipment, on the second band of frequencies 702, a second indication 721 of allocated communication resources to the user equipment. In the specific example, the second indication 721 is a DCI. The second indication 721 allocates (as indicated by the arrow 711) second communication resources 722 for the reception of data by the user equipment from the wireless communications network, the second communication resources 722 extending from time t4 to t5. In the specific example, the second communication resources 722 occur on a Physical Downlink Shared Channel (PDSCH). In the example of FIG. 7, the second indication 721 also schedules (as shown by arrow 712) third communication resources 724 starting at time t6 for a corresponding transmission of data from the user equipment to the wireless communications device. The third communication resources 724 may be on a Physical Uplink Control Channel (PUCCH). This data may include hybrid automatic repeat request (HARQ)-acknowledgement (ACK) feedback information.

In some embodiments, the second indication 721 is transmitted in response to determining, by the infrastructure equipment 272, that downlink data having a low latency tolerance (e.g. because it is URLLC data) is to be transmitted to the communications device 270. The infrastructure equipment 272 determines that it is necessary to schedule the transmission of the downlink data within a certain time period (e.g. so that it is completely transmitted before time t5), and allocates the second communication resources 722 accordingly.

As will be appreciated from FIG. 7, resources for the scheduled transmission of data and the scheduled reception of data have both been allocated between t4 and t5. Since the user equipment in this example is a HD-FDD device, the device cannot simultaneously transmit and receive data. Therefore an intra-UE HD-FDD collision 740 occurs. As described above, the intra-UE HD-FDD collision 740 may arise because the infrastructure equipment 272 has determined that it is necessary to allocate the second communication resources 722 for downlink transmission to the communications device 270. However, the present disclosure is not limited to any particular cause of the intra-UE HD-FDD collision. In particular, it should be appreciated that in some embodiments, the infrastructure equipment 272 allocates the second communication resources 722 for downlink transmission to the communications even though they are incompatible with the first communications resource 723 allocated earlier.

The efficient handling of cases where intra-UE DL and UL transmissions collide in a communications device operating according to a HD-FDD mode of operation therefore represents a technical challenge.

Embodiments of the present technique provide a method of operating a communications device in a wireless communications network, the method comprising: selecting first uplink communication resources of an uplink of a wireless access interface for transmitting uplink data to an infrastructure equipment of the wireless communications network, selecting second downlink communication resources of a downlink of the wireless access interface for receiving downlink data transmitted by the infrastructure equipment of the wireless communications network, detecting a collision whereby, in accordance with the capabilities of the communications device, the communications device cannot both transmit signals using the first uplink communication resources and receive and decode signals transmitted using the second downlink communication resources, in response to detecting the collision, determining whether the second downlink communication resources are associated with a priority which is higher than a priority associated with the first uplink communication resources, and if the second downlink communication resources are associated with a priority which is higher than the priority associated with the first uplink communication resources, receiving the downlink data using the second downlink communication resources, and refraining from transmitting the uplink data using the first uplink communication resources.

In accordance with some embodiments of the present technique, the communications device selects one of the first and second communication resources to be used based on one or more indications transmitted by the infrastructure equipment.

In some embodiments, the communications device selects one of the first and second communication resources to be used based on pre-defined rules, which may be specified in appropriate standards specifications.

In some embodiments of the present technique, the communications device is configured in accordance with two different services. That is, the communications device may be transmitting and/or receiving data associated with a first service having first quality of service requirements, and data associated with a second service, having second quality of service requirements.

The first and second quality of service requirements may be characterised by one or more of a maximum permitted latency for transmission of the data, a minimum average data rate, a reliability (e.g. probability of successful reception) and any other parameter(s) which define requirements for the transmission and reception of data.

In some embodiments, the first service and the second service may be eMBB and URLLC, respectively.

In some embodiments, one or both of the first and second communication resources may be associated with a priority level. In some embodiments, control signalling allocating the communication resources may comprise a priority indication which indicates the priority level associated with the allocated communication resources.

Preferably, the priority indication indicates the priority level which is applicable to the corresponding communication resources, and is to be used both in a scenario where the allocated resources collide with other allocated resources in the same direction (i.e. where both resources are uplink resources or where both resources are downlink resources) and in a scenario where the allocated resources collide with other allocated resources in the opposite direction (e.g. in the case of an intra-UE HD-FDD collision).

In some embodiments, the priority indication is a "Priority Indicator" field included within the control signalling which allocates the communication resources. The priority indication may be a binary indication, in which '0' indicates a low priority level, and '1' indicates a high priority level.

In some embodiments, where the control information allocates communication resources for the downlink transmission of data and communication resources for the uplink transmission of corresponding HARQ-ACK information, the priority indication applies to both sets of allocated communication resources. For example, a Priority Indicator in a downlink grant may indicate the priority of both communication resources allocated on a downlink shared channel for the downlink transmission of data, and communication resources allocated on an uplink control channel for the uplink transmission of acknowledgement information relating to the transmitted downlink data.

Accordingly, in response to detecting an intra-UE HD-FDD collision, the communications device may determine the priority levels associated with the colliding uplink and downlink communication resources. If one of the priority levels is higher than the other (e.g. the first communication resources are indicated as 'high' priority level, and the second communication resources are indicated as 'low' priority), the communications device selects the communication resources having the higher priority, and uses them for their allocated purpose. The communications device refrains from using the communication resources having the lower priority.

Figure 8:
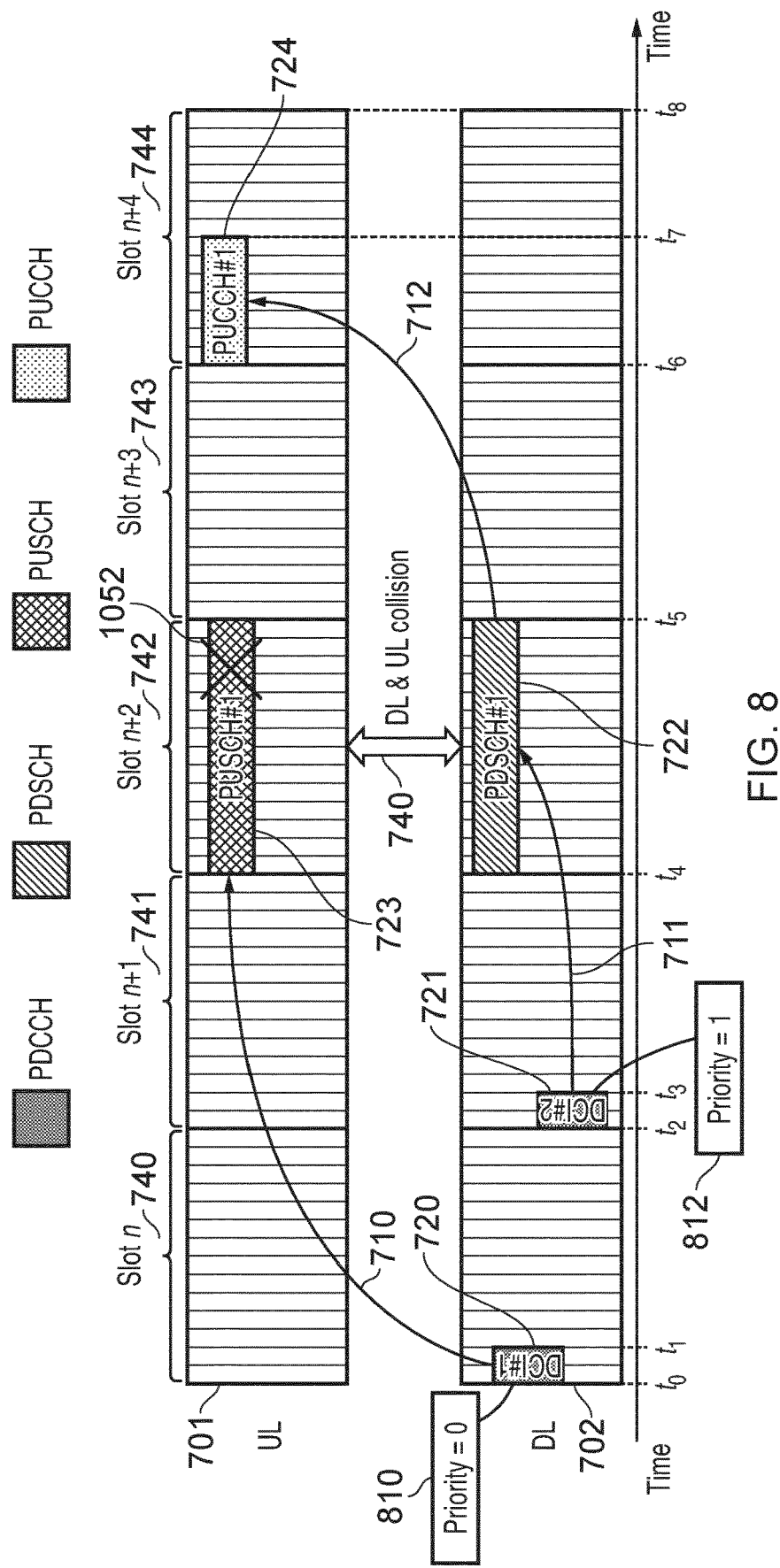
FIG. 8 illustrates the use of priority indications for resolving an intra-UE HD-FDD collision, in accordance with embodiments of the present technique.

FIG. 8 illustrates the use of priority indications for resolving an intra-UE HD-FDD collision, in accordance with embodiments of the present technique.

Many of the features shown in FIG. 8 correspond to features shown in FIG. 7. These are numbered with like reference numerals, and their description will not be repeated, for conciseness.

In the example of FIG. 8, each of the first indication 720 and the second indication 721 comprise respective first and second priority indications 810, 812. The first priority indication 810 comprises a single bit set to '0' to indicate that the first communication resources 723 allocated for the uplink transmission of data are associated with a low priority. The second priority indication 812 comprises a single bit set to '1' to indicate that the second communication resources 722 allocated for the downlink transmission of data are associated with a high priority.

The priority indications 810, 812 may be determined by the infrastructure equipment 272 based on quality of service requirements associated with respective data to be transmitted using the first communication resources 723 and the second communication resources 722.

The allocation of the second communication resources 722 may be in response to determining that the data to be transmitted using the second communication resources 722 must, in accordance with its associated quality of service requirements, be transmitted before, for example, time t5.

In some embodiments, the infrastructure equipment 272 may determine, based on the capabilities of the communications device 270 and the allocation of the first and second communication resources 723, 722 that an intra-UE HD-FDD collision will be detected at the communications device 270.

The priority indication may be a 3GPP Release 16 Physical Layer Priority Level. In some embodiments, the scope of the 3GPP Release 16 Physical Layer Priority Level may be extended to apply to all communication resources allocated by means of the downlink control information in which it is included.

In response to receiving the first indication 720 and the second indication 721, the communications device 270 determines that the communication resources allocated by the first indication 720 and the second indication 721 (specifically, the first communication resources 723 and the second communication resources 722, respectively) overlap in time, from time t4 to time t5.

Additionally, based on the first priority indication 810 and the second priority indication 812, the communications device determines that the priority of the first communication resources 723 is lower than that of the second communication resources 722.

In response to these determinations, the communications device 270 determines that the second communication resources 722 are to be used for their allocated purpose, and accordingly controls its receiver to receive downlink data transmitted using the second communication resources 722.

The communications device 270 additionally refrains from transmitting signals using the first communication resources 723, as indicated by the 'X' 802 in FIG. 8.

As described above, in accordance with some embodiments, the second priority indication 812 may apply also to the third communication resources 724 allocated by the second indication 721. In other embodiments, a control indication allocating resources both for the transmission of data and for the transmission of subsequent acknowledgement information may comprise separate priority indications.

Accordingly, in response to determining that an intra-UE HD-FDD collision is detected in respect of communication resources allocated by a single indication, the communications device 270 may determine which resources are to use based on the corresponding priority indication associated with the conflicting communication resources.

Accordingly, for example, it would be possible to ensure that data transmissions are associated with a high priority, while acknowledgement information (which may be more delay-tolerant) could be associated with a low priority, even when both the data transmission and acknowledgement information are transmitted using resources allocated by the same downlink control indication.

In the example of FIG. 8, the respective priorities associated with communication resources are indicated dynamically.

In some embodiments, a priority associated with communication resources is configured statically, or semi-statically. For example, in some embodiments, the priority of a channel, such as PUSCH, PUCCH and PDSCH may be configured in a semi-static manner (i.e. whereby a priority indication remains valid until superseded) by radio resource control (RRC) signalling. Accordingly, the network can indicate which channel has higher priority in an efficient manner. For example, in some embodiments, the network can indicate that PUCCH has higher priority than PDSCH, and that PDSCH has higher priority than PUSCH. It will be readily appreciated that this is just an example and that other priority arrangements can be configured in such a manner.

In some embodiments, communication resources are allocated or configured in a periodic, semi-static manner, such as by means of semi-persistent scheduling (SPS) or a configured grant. In some such embodiments, the priority of communication resources allocated in this manner are indicated within the signalling configuring the communication resources. Accordingly, for example, in some embodiments, PDSCH and/or PUSCH resources which are configured using SPS and/or configured grant may be configured by the network and their respective priorities may be indicated within the SPS and/or configured grant configuration signalling.

Accordingly, priorities can be indicated for communication resources which are not dynamically allocated, allowing the communications device 270 to resolve an intra-UE HD-FDD collision when one is detected involving such communication resources.

In some embodiments, priorities can be indicated by means of static signalling, such as in system information, or RRC reconfiguration. Accordingly, the infrastructure equipment 272 can indicate a priority associated with communication resources which are statically allocated (such as for broadcast channels, synchronisation signals and sounding reference signals).

It will be appreciated that in some scenarios, priorities associated with the first and second communication resources by means of explicit indications may be equal. Alternatively, no explicit indication of a priority may be provided, for example because the inclusion of a priority indication is optional for, or not supported by, the infrastructure equipment 272. In some examples and embodiments, a scope of a priority indication in a control indication allocating communication resources may not extend to all communication resources allocated by that control indication. For example, the priority indication may correspond to the 3GPP Release 16 Physical Layer Priority Level, which does not apply to downlink control channels (such as PDCCH) and uplink random access channels (such as PRACH).

According to some embodiments of the present technique, further prioritisation rules are defined for use in such scenarios, where one or both of the conflicting communication resources have no assigned priority, or where both of the conflicting communication resources have the same assigned priority.

In some embodiments of the present technique, when the communications device 270 is allocated conflicting uplink and downlink communication resources (i.e. detects an intra-UE HD-FDD collision) the communications device 270 selects for use for transmitting or receiving data, the communication resources whose allocation was indicated by the most recently received signalling.

Figure 9:
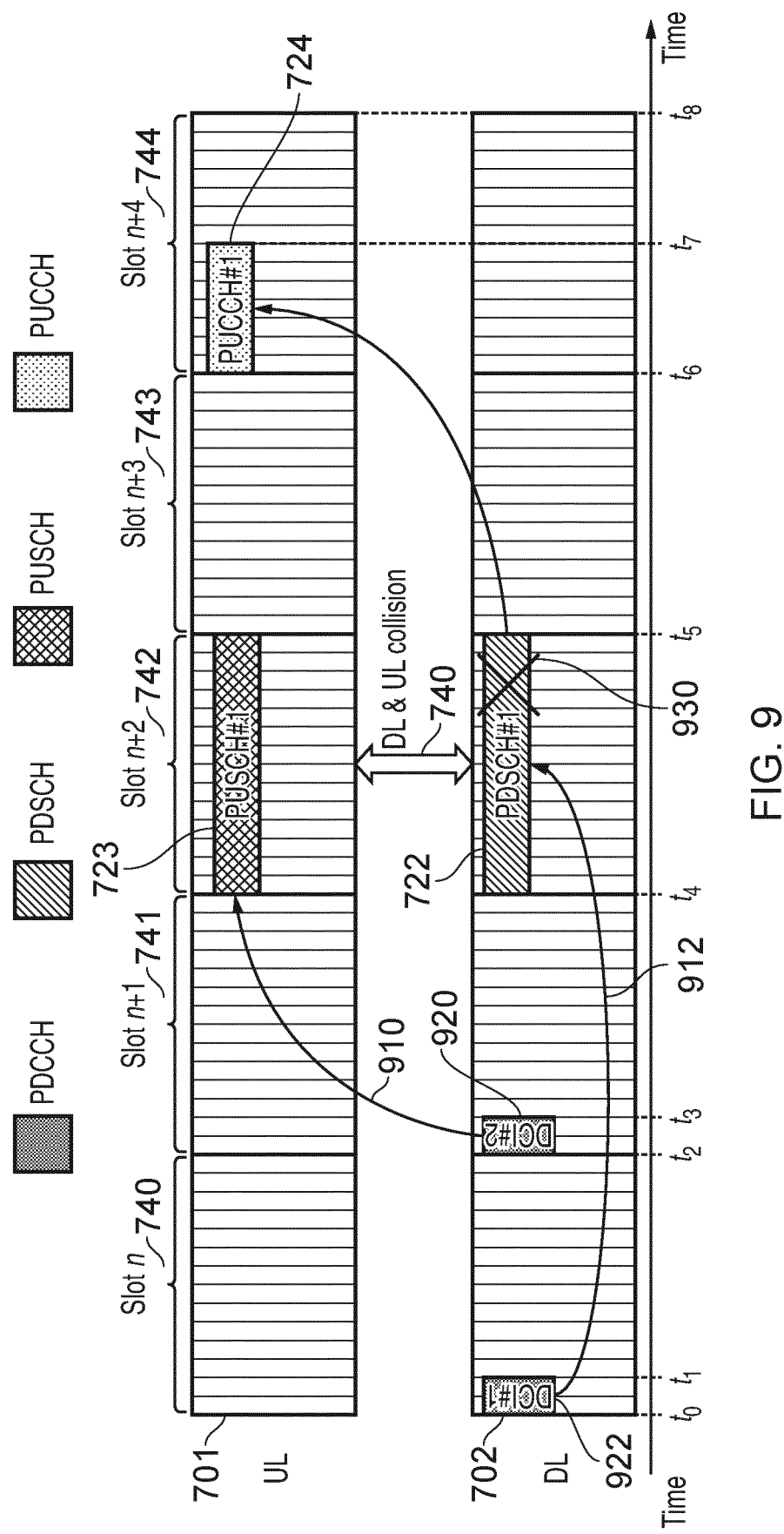
FIG. 9 illustrates a technique for resolving an intra-UE HD-FDD collision based on the time of transmission of the indications allocating the communication resources, in accordance with embodiments of the present technique.

FIG. 9 illustrates a technique for resolving an intra-UE HD-FDD collision based on the time of transmission of the indications allocating the communication resources, in accordance with embodiments of the present technique.

Many of the features shown in FIG. 9 correspond to features shown in FIG. 7. These are numbered with like reference numerals, and their description will not be repeated, for conciseness.

In contrast to the examples of FIG. 7 and FIG. 8, in the example of FIG. 9, the first communication resources 723 are allocated by a first indication 920 which is transmitted from time t2 to time t3, as indicated by the arrow 910. The second communication resources 722 are allocated by a second indication 922 which is transmitted from time t0 to time t1, as indicated by the arrow 912.

As in the example of FIG. 8, the allocation of communication resources may be based on quality of service requirements associated with data to be transmitted. In particular, for example, the allocation of the first communication resources 723 may be in response to determining that the data to be transmitted using the first communication resources 723 must, in accordance with its associated quality of service requirements, be transmitted before, for example, time t5.

Because the first indication 920 is transmitted after the second indication 922, the first communication resources 723 allocated by the first indication 920 have higher priority than the second communication resources 722.

Accordingly, in response to detecting the intra-UE HD-FDD collision 740, the communications device 270 selects the first communication resources 723 to be used for the transmission of data, and refrains from receiving data using the second communication resources 722, as indicated by the 'X' 930.

Accordingly, the embodiments of the present technique provide for a resolution of an intra-UE HD-FDD collision, even when explicitly allocated priorities associated with communication resources are equal and/or where no explicitly allocated priorities are associated with the communication resources.

In some embodiments of the present technique, in response to detecting an intra-UE HD-FDD collision, the communications device 270 selects communication resources for transmission or reception based on a type of resource allocation associated with the respective communication resources. For example, in some embodiments, communication resources allocated by means of a dynamic grant (such as using downlink control information) have a higher priority than communication resources which are statically or semi-statically allocated, e.g. by means of a configured grant or by means of semi-persistent scheduling. For example, for the case where priority indications are not used or the priorities of the colliding transmissions are equal, communication resources on a PDSCH, allocated by means of a dynamic grant, may have higher priority than a communication resources on a PUSCH which are allocated by a configured grant.

In some embodiments, the communications device is not required to transmit on communication resources which are semi-statically allocated (e.g. by configured grant). Accordingly, embodiments of the present technique can provide a deterministic resolution to an intra-UE HD-FDD collision, irrespective of whether the communications device 270 would have transmitted using the resources allocated by the configured grant.

In some embodiments of the present technique, when the communications device 270 is allocated conflicting uplink and downlink communication resources (i.e. detects an intra-UE HD-FDD collision) the communications device 270 selects for use for transmitting or receiving data, the communication resources based on the nature of the data to be transmitted or received using the allocated communication resources. This selection may additionally or alternatively be based on a manner in which the communication resources are allocated.

In an example, data originating at (and destined for) a protocol layer above an RLC or MAC layer has a priority higher than HARQ acknowledgement information or channel state information. In some example embodiments, data originating at (and destined for) a protocol layer above an RLC or MAC layer has a priority higher than a scheduling request (SR).

In some example embodiments, data originating at (and destined for) a protocol layer above an RLC or MAC layer has a priority higher than a transmission on a random access channel. The transmission on the random access channel may be either for determining a timing advance for the communications device or for requesting the establishment or activation of an RRC connection.

A priority for the corresponding communication resources may be determined accordingly.

For example, where priority indications are not used or the indicated priorities of the colliding transmissions are equal, communication resources on a PDSCH (used for transmitting user plane data) have a higher priority than communication resources on a PUCCH (which are to be used for transmitting HARQ-ACK, CSI information, or an SR) and communication resources on a PRACH (used for timing advance-related signalling and RRC connection request transmissions).

In practise, the communications device and infrastructure equipment are configured to transmit user data such that the probability of successful reception and decoding of a transmission of user data is significantly greater than 50%, for example, it may be around 90%, around 99%, or around 99.999%. The configuration (and corresponding probability) may depend on the service (e.g. URLCC data may be transmitted to have around a 99.999% probability of successful decoding). Accordingly, acknowledgement information is more likely to comprise positive acknowledgement information than negative acknowledgement information. The lack of reception of positive acknowledgement information may not severely impact the provision of a service.

Similarly, the absence of channel state information may have only a limited effect when used in conjunction with a relatively slow outer loop link adaptation. In some embodiments, the infrastructure equipment 272 may, in response to determining that the channel state information has not been (or will not be) transmitted due to the intra-UE HD-FDD collision, transmit an explicit request for channel state information (e.g. to replace the information not transmitted as a result of the intra-UE HD-FDD collision). The explicit request may comprise an uplink grant allocating communication resources for an aperiodic channel state information report. That is, mitigation may be achieved by subsequently transmitting channel state information in response to a separate request for a (e.g. aperiodic) channel state information report. The request may comprise an uplink grant.

A scheduling request or random access channel transmission does not constitute the transmission of user data, but merely requests an allocation of uplink communication resources or the establishment of an RRC connection. Accordingly, the disruption to an ongoing service resulting from a delay to a transmission of an SR or random access channel transmission may be relatively low.

On the other hand, embodiments of the present technique can provide a lower latency transmission of data (e.g. the data transmitted using the PDSCH resources). Embodiments can provide the lower latency transmission of data by deprioritising other transmissions so that the other transmissions are cancelled or delayed, while minimising the effect on the provision of a service.

In some embodiments of the present technique, downlink communication resources during which the infrastructure equipment 272 may transmit control information to the communications device 270 may have a higher priority than the random access transmissions referred to above. The downlink communication resources during which the infrastructure equipment 272 may transmit control information to the communications device 270 are referred to herein as a PDCCH monitoring period, and the communications device 270, in the absence of any conflict is required to receive and decode signals transmitted during these resources in order to determine if the infrastructure equipment 272 has in fact transmitted control information to the communications device 270. The control information may be, for example, downlink control information comprising a dynamic allocation of communication resources.

Although the infrastructure equipment 272 may not make use of a particular instance of the PDCCH monitoring period (in which case a failure of the communications device 270 to monitor these resources has no consequence), these resources may be used to dynamically allocate communication resources for the uplink or downlink transmission of data to or from the communications device 270, such as by means of downlink control information (DCI). A failure to receive such allocation as a result of an intra-UE HD-FDD collision, could result in a delay in the communications device 270 receiving (or being able to transmit) data, and may result in inefficient use of communication resources.

Similarly, in some embodiments, downlink communication resources during which the infrastructure equipment 272 may transmit control information to the communications device 270 may have a higher priority than uplink communication resources allocated by means of a configured grant (i.e. in a semi-persistent manner). Such embodiments can avoid the possibility that the communications device 270 fails to receive scheduling information which dynamically allocates communication resources.

On the other hand, in some embodiments of the present technique, downlink communication resources during which the infrastructure equipment 272 may transmit control information to the communications device 270 (the PDCCH monitoring period) have a lower priority than uplink communication resources allocated by means of a dynamic grant (e.g. by means of a DCI). Such embodiments can avoid the possibility that the communications device 270 fails to make use of dynamically allocated communication resources.

Preferably, in some embodiments, the infrastructure equipment 272 determines that the uplink communication resources, allocated by means of the dynamic grant, conflict (i.e. cause an intra-UE HD-FDD collision) with the PDCCH monitoring period, and in response, refrains from transmitting control information during the PDCCH monitoring period.

Embodiments of the present technique can therefore ensure efficient use of communication resources. For example, where an uplink communication resources allocation is a dynamic allocation, it is highly likely that the communications device 270 has data ready to send (unlike the case for configured grant resources). Accordingly the infrastructure equipment 272 can dynamically schedule uplink communication resources irrespective of any potential conflict with a PDCCH monitoring period.

In some embodiments of the present technique, downlink communication resources during which the infrastructure equipment 272 may transmit control information to the communications device 270 (the PDCCH monitoring period) have a higher priority than uplink communication resources allocated for the transmission of acknowledgement information. Preferably, in some embodiments, the infrastructure equipment 272 determines that the uplink communication resources allocated for the transmission of acknowledgement information conflict (i.e. cause an intra-UE HD-FDD collision) with the PDCCH monitoring period, and in response, refrains from transmitting control information during the PDCCH monitoring period.

In general, according to at least some embodiments of the present technique, communication resources allocated explicitly and dynamically may have a higher priority than communication resources allocated statically or semi-statically. Such embodiments can permit the infrastructure equipment 272 to dynamically and explicitly allocate communication resources without regards to the possibility of a conflict with statically or semi-statically-allocated resources because, should any conflict in fact arise, the communications device will, in accordance with embodiments of the present technique, select for use the dynamically allocated communication resources in preference to the statically or semi-statically-allocated resources. Accordingly, embodiments of the present technique can permit greater flexibility in the dynamic allocation of communication resources.

In some embodiments of the present technique, downlink communication resources during which the infrastructure equipment 272 may transmit control information to the communications device 270 (the PDCCH monitoring period) have a higher priority than uplink communication resources allocated for the transmission of channel state information (CSI). The uplink communication resources may be allocated on a PUCCH.

In some embodiments of the present technique, downlink communication resources during which the infrastructure equipment 272 may transmit control information to the communications device 270 (the PDCCH monitoring period) have a higher priority than uplink communication resources allocated, or selected, for the transmission of an SR. Because the SR may be sent autonomously, the infrastructure equipment 272 may not be able to determine whether an intra-UE HD-FDD collision has occurred (or will occur) in respect of a transmission within the PDCCH monitoring period. Accordingly, embodiments of the present technique can ensure that the communications device 270 will monitor the PDCCH monitoring period resources if the infrastructure equipment 272 would be unable to determine that an intra-UE HD-FDD collision would occur as a result of a transmission using the PDCCH monitoring period resources.

In some embodiments, if, during the PDCCH monitoring period, the communications device both has refrained from transmitting an SR (in accordance with the above prioritisation) and receives an allocation of uplink resources (the allocation being indicated by a transmission using the PDCCH monitoring period resources), then the communications device 270 may transmit, using the allocated uplink resources, a buffer status report (BSR), thus avoiding the need to send an SR.

In accordance with embodiments of the present technique, the infrastructure equipment 272 may refrain from transmitting downlink control information during the PDCCH monitoring period in response to a determination that other communication resources having a higher priority than the PDCCH monitoring period are, or may be, allocated for or selected by the communications device.

Figure 10:
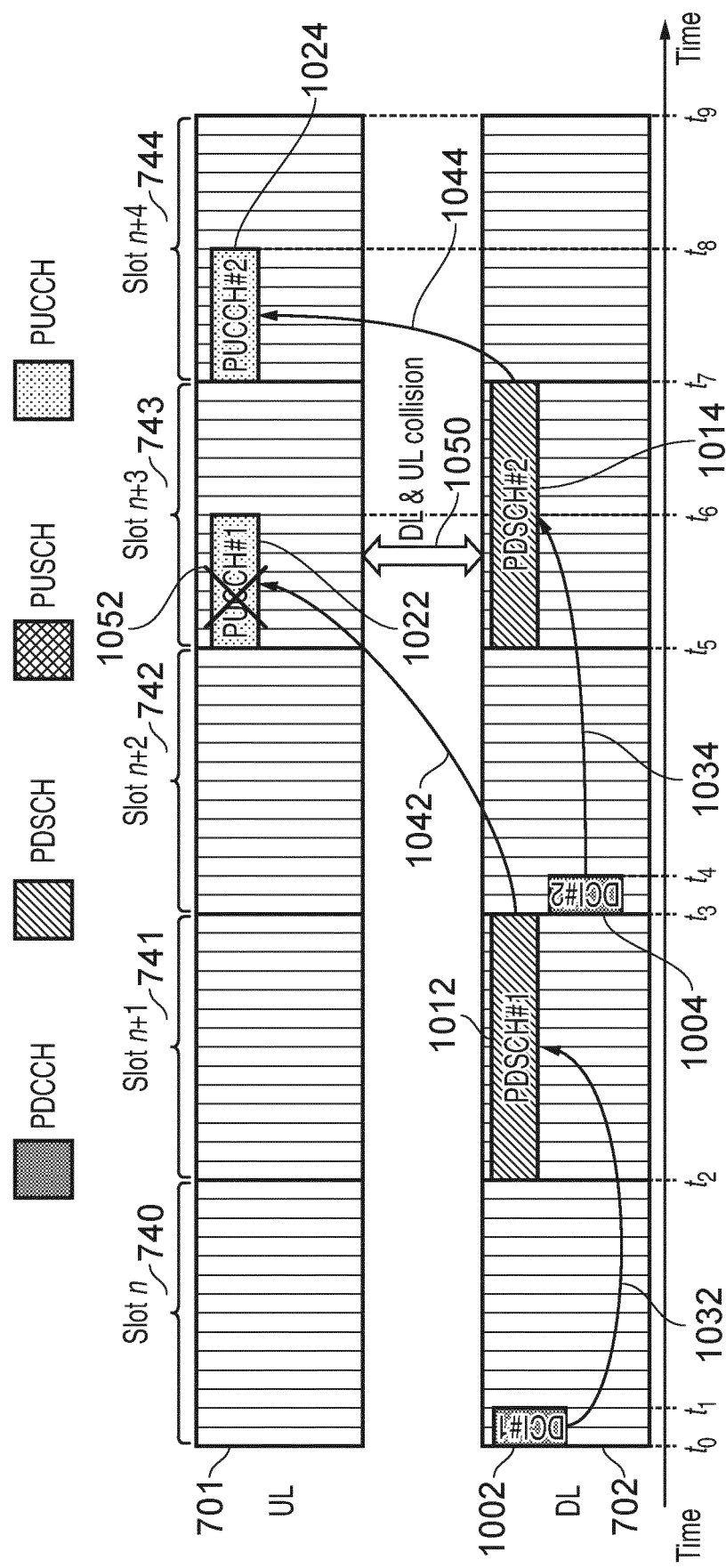
FIG. 10 illustrates a technique for resolving an intra-UE HD-FDD collision based on the nature of the data to be transmitted or received using the allocated communication resources, in accordance with embodiments of the present technique.

FIG. 10 illustrates a technique for resolving an intra-UE HD-FDD collision based on the nature of the data to be transmitted or received using the allocated communication resources, in accordance with embodiments of the present technique.

Many of the features shown in FIG. 10 correspond to features shown in FIG. 7. These are numbered with like reference numerals, and their description will not be repeated, for conciseness.

In the example of FIG. 10, first and second indication 1002, 1004 allocate respective first and second downlink communication resources 1012, 1014 on downlink carrier frequency band 702 (as indicated by the arrows 1032, 1034), and respective first and second uplink communication resources 1022, 1024 on uplink carrier frequency band 701 (as indicated by the arrows 1042, 1044).

The first and second downlink communication resources 1012, 1014 are allocated on a downlink shared channel and are for the transmission of data by the infrastructure equipment 272 to the communications device 270. The first and second uplink communication resources 1022, 1024 are allocated on an uplink control channel and are for the transmission of acknowledgement information by the communications device 270 to the infrastructure equipment 272.

The first uplink communication resources 1022 and the second downlink communication resources 1014 overlap in time from time t5 to time t6.

Accordingly, in response to receiving the first and second indications 1002 and 1004, the communications device 270 detects an intra-UE HD-FDD collision 1050. The communications device 270 resolves the intra-UE HD-FDD collision 1050 based on the intended purpose of the colliding communication resources. Specifically, in the example of FIG. 10, because the first uplink communication resources 1022 are for the purpose of transmitting acknowledgement information, and the second downlink communication resources 1014 are for the purpose of transmitting user data (i.e. data originating above the MAC/RLC protocol layers), then the second downlink communication resources 1014 are given precedence and are selected for the transmission/reception of data. The communications device 270 accordingly refrains from transmitting using the first uplink communication resources 1022, as indicated by the 'X' 1052.

As described above, in accordance with example embodiments of the present technique, the communications device 270 may select, from communication resources which are colliding and therefore result in an intra-UE HD-FDD collision, one of the colliding communication resources for the transmission or reception of data.

The selection may be based on one or more of an explicitly-indicated priority level associated with the communication resources, a time of allocation of the communication resources, a type of allocation method used for the communication resources, and a purpose (i.e. nature of data to be transmitted) of the allocated communication resources.

The selection may be based on a different combination of factors for the two conflicting communication resources. For example, a selection may take account of a type of allocation method in respect of one of the resources, and a combination of type of allocation method and purpose of the other resources.

An example prioritisation scheme to be applied which does not rely on explicitly-indicated priority levels is shown in Table 1.

TABLE 1

Example prioritisation rules

| Uplink communication resources | Downlink communication resources | |
|---|---|---|
| | Allocation is for transmission of control information (e.g. resources are allocated on PDCCH) | Allocation is for transmission of data (e.g. resources are allocated on PDSCH) |
| Configured grant for data transmission (e.g. CG PUSCH) | Downlink (DL) resources have priority | DL resources have priority |
| Dynamic grant for data transmission (e.g. DG PUSCH) | Uplink (UL) resources have priority | Later grant has priority |
| Allocation for transmission of channel state information (CSI) e.g. on PUCCH | Uplink (UL) resources have priority | DL resources have priority |
| Allocation for transmission of acknowledgement information (e.g. HARQ-ACK) e.g. on PUCCH | Uplink (UL) resources have priority | DL resources have priority |
| Selection for scheduling request (SR), e.g. on PUCCH | DL resources have priority | DL resources have priority |
| Random access channel resources (e.g. PRACH) | DL resources have priority | DL resources have priority |

It will be appreciated that the scope of the present disclosure is not limited to the above specific example, and that any subset or combination of the above rules are also within the scope of the present disclosure.

In some embodiments, the above prioritisation scheme is applied only if no explicit priority indication is received in respect of one or both of the conflicting communication resources, or if explicit priority indications are received and they are equal.

In some embodiments, the above prioritisation scheme is applied only if (additionally or alternatively) no slot format indicator is received for one or both of the uplink and downlink communication resources.

As disclosed herein, as a result of an intra-UE HD-FDD collision, the communications device 270 may refrain from using allocated or selected communication resources.

There thus arises a technical challenge to mitigate the effect of such refraining. Embodiments of the present technique can provide a method for transmitting control information (such as acknowledgement information, scheduling request or channel state information) using third communication resources. The third communication resources may be allocated for the transmission of acknowledgement information associated with user data transmitted using downlink communication resources. The downlink communication resources may be those resources which, with the communication resources which the communications device refrains from using, result in the intra-UE HD-FDD collision.

In some scenarios, the communications device 270 determines that it is to refrain from using uplink communication resources allocated for the purpose of transmitting acknowledgement information, such as PUCCH resources for transmitting HARQ-ACK information.

In accordance with example embodiments of the present technique, in such circumstances, the communications device 270 combines the acknowledgement information that would otherwise have been sent using the uplink communication resources with other acknowledgement information which is sent using other uplink resources.

In some examples, the other uplink resources are those which are allocated for the transmission of acknowledgement information associated with downlink data, the downlink data transmitted using communication resources which conflict with the (unused) uplink communication resources.

Figure 11:
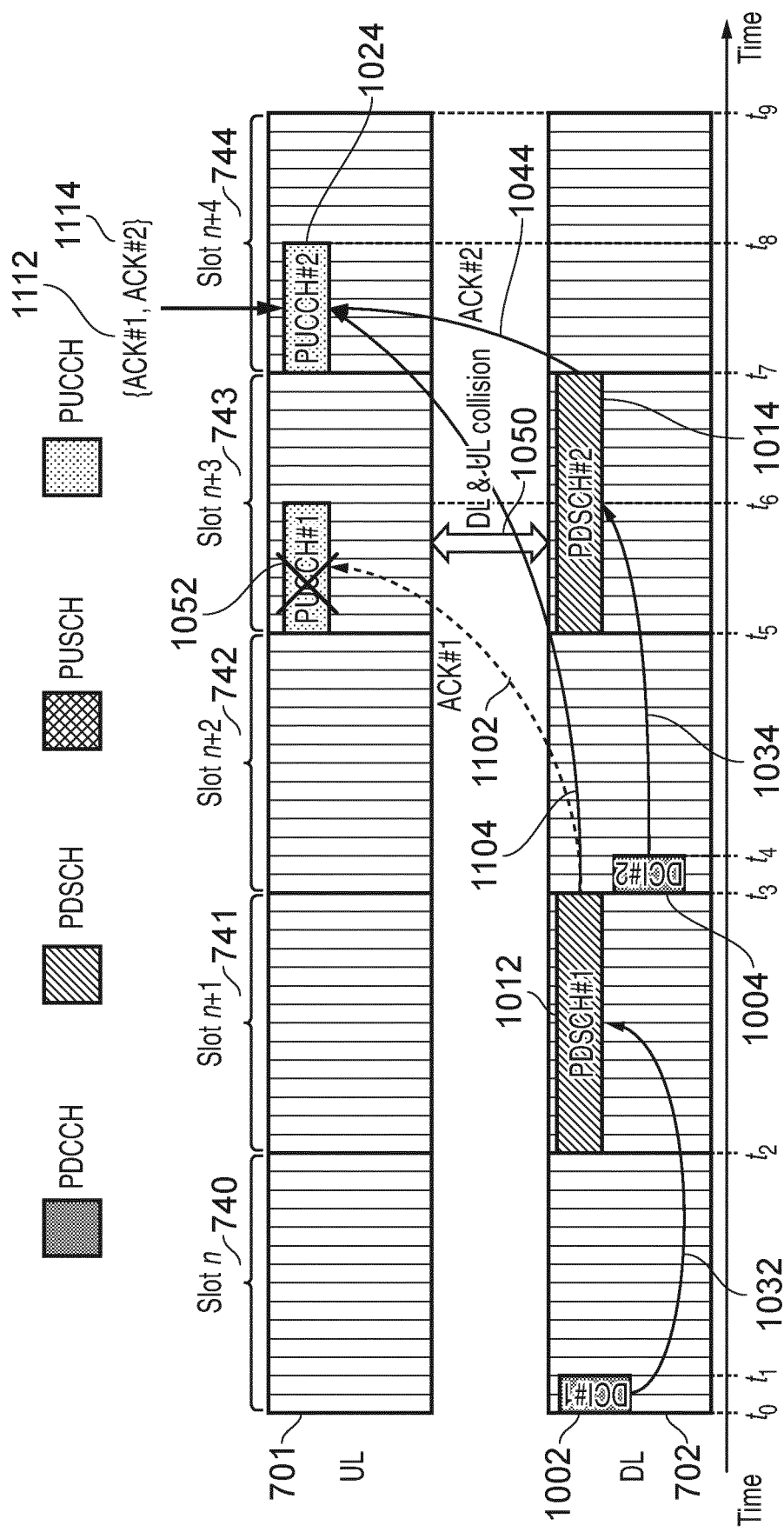
FIG. 11 illustrates an example technique for transmitting acknowledgement information in accordance with embodiments of the present technique.

FIG. 11 illustrates an example technique for transmitting acknowledgement information in accordance with embodiments of the present technique.

Many of the features shown in FIG. 11 correspond to features shown in FIG. 10. These are indicated with like reference numerals, and their description will not be repeated, for conciseness.

As in the example of FIG. 10, an intra-UE HD-FDD collision 1050 arises as a result of uplink communication resources 1022 allocated for the transmission of control information (specifically, acknowledgement information in respect of downlink data transmitted using first downlink communication resources 1012) overlapping in time with the second downlink communication resources 1014. The first downlink communication resources 1012 and second downlink communication resources 1014 are used for the transmission of first and second downlink data, respectively.

The communications device 270 determines that it is to use the second downlink communication resources 1014 (i.e. it attempts to receive and decode the data transmitted using those resources) and refrains from using the first uplink communications 1022.

In the example of FIG. 11, the communications device 270 receives and correctly decodes the first downlink data and the second downlink data. However, it is unable to indicate the correct decoding of the first downlink data using the first uplink communication resources 1022.

In accordance with embodiments of the present technique, the communications device 270 combines first acknowledgement information 1112 (which indicates that the first downlink data was received correctly) with second acknowledgement information 1114 and transmits the combination using the second uplink communication resources 1024.

In some embodiments, the combined acknowledgement information indicates both the acknowledgement status of the first downlink data and the acknowledgement status of the second downlink data.

In some embodiments, the combined acknowledgement information comprises an indication of a logical combination of the first and second acknowledgement statuses. For example, the combined acknowledgement information may indicate either that i) both the first and second data were successfully received and decoded, or ii) one or both of the first and second data were not successfully received and decoded.

Thus, in accordance with embodiments of the present technique, the communications device determines that the first acknowledgement information 1112 (for indicating an acknowledgement status of first data transmitted using the first downlink communication resources 1012) cannot be transmitted using the first uplink resources 1022, because of a conflict between the first uplink resources 1022 and the second downlink resources 1014. In response, the communications device 270 transmits acknowledgement information based on at least the first acknowledgement information 1112 using the second uplink communication resources 1024 allocated for the purpose of transmitting an indication of the acknowledgement status of second data transmitted using the second downlink resources 1014.

The infrastructure equipment 272 may, in accordance with embodiments of the present technique, determine that the intra-UE HD-FDD collision 1050 has occurred, and may, in response, determine that the communications device 270 will not transmit any acknowledgement information using the first uplink communication resources 1022. The infrastructure equipment 272 may further determine that the communications device 270 will, using the second uplink communication resources 1024, transmit acknowledgement information based on the acknowledgment status of the data transmitted using the first downlink communication resources 1012. The infrastructure equipment 272 may accordingly decode the acknowledgement information transmitted using the second uplink communication resources 1024 and update the acknowledgement status associated with the first data and, in some embodiments, the second data, accordingly.

In some example embodiments of the present technique, the communications device 270 detects an intra-UE HD-FDD collision, involving uplink communication resources allocated for the transmission of acknowledgement information, before the start of communication resources on which downlink data is to be transmitted, where the acknowledgement information is to indicate the acknowledgement status of the downlink data.

Figure 12:
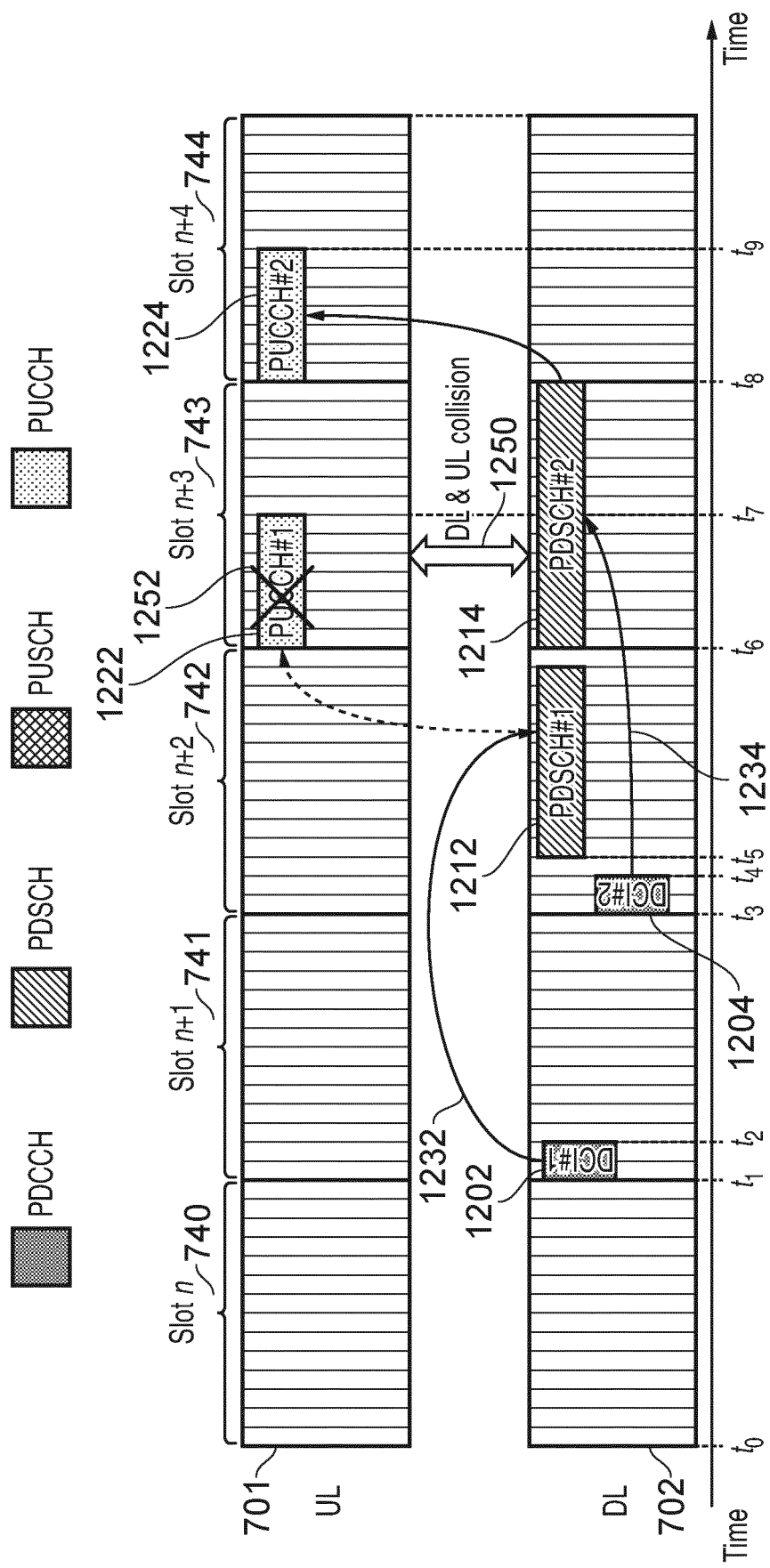
FIG. 12 illustrates an example of an intra-UE HD-FDD collision in accordance with embodiments of the present technique.

An example of this scenario is shown in FIG. 12.

FIG. 12 shows an intra-UE HD-FDD collision in accordance with embodiments of the present technique. Many of the features shown in FIG. 12 correspond to features shown in FIG. 7. These are numbered with like reference numerals, and their description will not be repeated, for conciseness.

In the example of FIG. 12, the first indication 1202 allocates (see arrow 1232) first downlink communication resources 1212 and first uplink communication resources 1222 for the purposes of transmitting acknowledgement information regarding the acknowledgement status of first data transmitted using the first downlink communication resources 1212. Similarly, the second indication 1204 allocates (see arrow 1234) second downlink communication resources 1214 and second uplink communication resources 1224 for the purposes of transmitting acknowledgement information regarding the acknowledgement status of second data transmitted using the second downlink communication resources 1214.

Thus, the intra-UE HD-FDD collision 1250 arises from the overlap in time (from time t6 to time t7) of the first uplink communication resources 1222 and the second downlink communication resources 1214. In the example of FIG. 12, the communications device 270 may detect the intra-UE HD-FDD collision 1250 after receiving the second indication 1204 and before the start (at time t5) of the first downlink communication resources 1212. The communications device 270 determines the relative priorities of the first uplink communication resources 1222 and the second downlink communication resources 1214 (which may be determined according to any techniques disclosed herein, or by any other method). In the example of FIG. 12, the first uplink communication resources 1222 have a lower priority than the second downlink communication resources 1214, and the communications device accordingly refrains from using the first uplink communication resources 1222, as indicated by the 'X' 1252.

Nevertheless, in accordance with embodiments of the present technique, the communications device 270 attempts to receive and decode the first data, even though it has no allocated and usable communication resources for the transmission of corresponding acknowledgement data. (As disclosed above, in fact in some embodiments, other resources may be used to transmit an indication based on the acknowledgement data). Thus, the communications device 270 may be able to receive the first downlink data without additional delay.

In some embodiments, when the communications device 270 identifies an intra-UE HD-FDD collision which causes it to refrain from using communication resources allocated for the transmission of acknowledgement information related to downlink data, and the identification occurs before the start of downlink resources allocated for the transmission of the downlink data, the communications device 270 refrains from attempting to receive or decode the downlink data.

Figure 13:
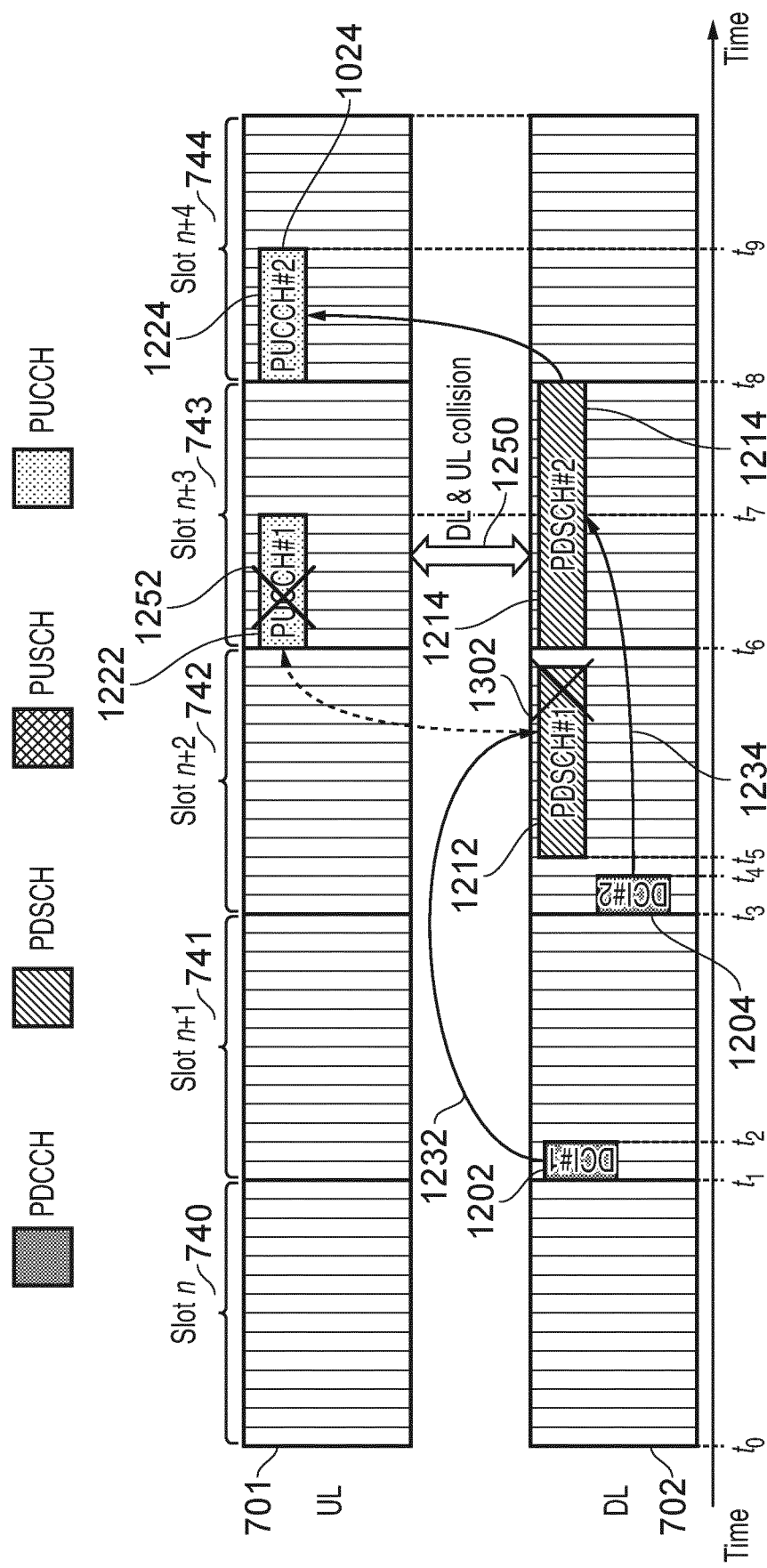
FIG. 13 illustrates a further example of an intra-UE HD-FDD collision in accordance with embodiments of the present technique.

An example of this is shown in FIG. 13. FIG. 13 shows an intra-UE HD-FDD collision in accordance with embodiments of the present technique. Many of the features shown in FIG. 13 correspond to features shown in FIG. 12. These are numbered with like reference numerals, and their description will not be repeated, for conciseness.

In the example of FIG. 13, the communications device 270 identifies the intra-UE HD-FDD collision 1250 and refrains (see 'X' 1252) from using the first uplink communication resources 1222 allocated for the transmission of acknowledgement information related to downlink data to be transmitted during the allocated first downlink communication resources 1212.

The identification occurs before the start (i.e. before time t5) of the first downlink communication resources 1212 allocated for the transmission of the downlink data. In response, the communications device 270 refrains from attempting to receive or decode the signals transmitted in the first downlink communication resources 1212, as indicated by the 'X' 1302.

In the example of FIG. 13, in accordance with embodiments of the present technique, the infrastructure equipment 272 also identifies the intra-UE HD-FDD collision before time t5, and determines that the communications device 270 will refrain from attempting to receive or decode signals transmitted during the first downlink communication resources 1212. Accordingly, the infrastructure equipment may schedule, and transmit, other data (e.g. for another communications device) using the first downlink communication resources 1212.

Accordingly, embodiments of the present technique can permit more efficient use of communication resources in the event of an intra-UE HD-FDD collision arising in respect of communication resources allocated for acknowledgement information.

As described above, refraining from attempting to decode data may allow more efficient use of communication resources, however this may lead to an increased latency associated with the data. Accordingly, in some embodiments, the communications device 270 determines whether to attempt to decode the data based on a latency requirement associated with the data which would be transmitted using the first downlink communication resources 1212. That is, when the data which would be transmitted using the first downlink communication resources 1212 is associated with a low maximum latency requirement, the communications device 270 attempts to decode the data, otherwise, the communications device 270 does not attempt to decode the data.

Additionally or alternatively, the communications device 270 determines whether to attempt to decode the data based on a data decode indication transmitted by the infrastructure equipment 272. The data decode indication may be transmitted within the indication allocating the respective downlink communication resources (i.e. the first indication 1202 in the example of FIG. 12) or within RRC signalling, or using any other appropriate signalling.

The behaviour of the infrastructure equipment 272 may be in correspondence with that of the communications device 270.

In accordance with some embodiments of the present technique, the communications device 270 may refrain from using uplink communication resources allocated for the transmission of control information, such as channel state information (CSI) or a scheduling request (SR).

This may be as a result of an intra-UE HD-FDD collision in which the uplink communication resources allocated for the transmission of the control information conflict (e.g. overlap in time) with downlink communication resources allocated for the transmission of downlink data. The downlink communication resources may be allocated together with second uplink communication resources for the purpose of transmitting acknowledgement information relating to the downlink data.

In some embodiments, the communications device, in such a situation, may transmit the control information using the second uplink communication resources. That is, the second uplink communication resources may be used for the control information and, or instead of, the acknowledgment information.

Preferably, the manner in which the second uplink communication resources are used is in accordance with predetermined rules, or in some other manner such that the infrastructure equipment 272, having detected the intra-UE HD-FDD collision, is able to decode the information transmitted using the second uplink communication resources.

In some embodiments, the infrastructure equipment 272 may not know whether in fact the communications device 270 had selected the first uplink communication resources for the transmission of control information. For example, the first uplink communication resources may be optionally used by the communications device to transmit a scheduling request, if the communications device determines that it has new data available for transmission.

In some such embodiments, the infrastructure equipment 272 may attempt to decode the signals received using the second uplink communication resources by means of 'blind detection', i.e. on the assumption that an intra-UE HD-FDD collision occurred, and on the assumption that no intra-UE HD-FDD collision occurred. It will be appreciated that the order of the blind detection may be reversed, and the blind detection attempts may cease if the infrastructure equipment determines with high probability that it has decoded the signals in accordance with the manner in which they were, in fact, transmitted.

Figure 14:
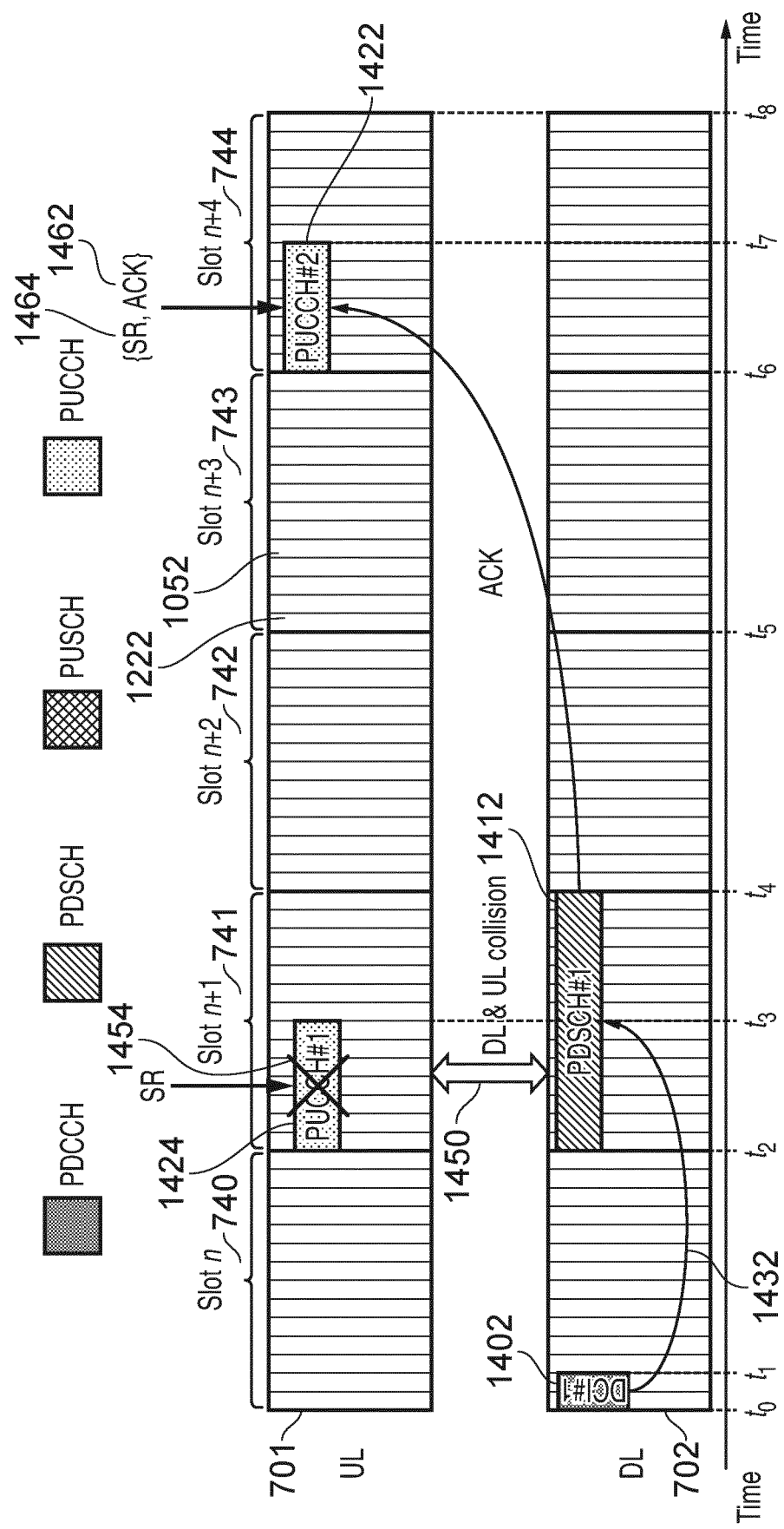
FIG. 14 illustrates an example of an intra-UE HD-FDD collision in which a scheduling request is transmitted using resources allocated for the transmission of acknowledgement information, in accordance with embodiments of the present technique.

FIG. 14 shows an example of an intra-UE HD-FDD collision in which a scheduling request is transmitted using resources allocated for the transmission of acknowledgement information, in accordance with embodiments of the present technique.

Many of the features shown in FIG. 14 correspond to features shown in FIG. 7. These are numbered with like reference numerals, and their description will not be repeated, for conciseness.

In the example of FIG. 14, the first indication 1402 allocates first downlink communication resources 1412 and first uplink communication resources 1422.

Separately, the communications device 270 selects second uplink communication resources 1424 for the transmission of control information. The control information in the example of FIG. 14 is a scheduling request. However, it will be appreciated that the control information may be any other control information.

The second communication resources 1424 may be selected from periodic communication resources which are statically or semi-statically (e.g. by RRC configuration) allocated for the communications device 270 to use on an as-needed basis for the transmission of control information.

Because the second uplink communication resources 1424 and the first downlink communication resources 1412 overlap in time (from time t2 to time t3), the communications device 270 detects intra-UE HD-FDD collision 1450.

In accordance with a prioritisation scheme and/or other rules (such as those described elsewhere herein), the communications device 270 refrains from using the second uplink communication resources 1424.

In response, the communications device 270 transmits the control information (scheduling request 1464) using the first uplink communication resources 1422. In the example of FIG. 14, the communications device 270 also transmits acknowledgement information 1462 using the first uplink communication resources 1422.

As described above, the infrastructure equipment 270 cannot identify the intra-UE HD-FDD collision 1450 because the use of the second communication resources 1424 is optional for the communications device 270. However, it determines that there is a possibility of the occurrence of the intra-UE HD-FDD collision 1450 and accordingly decodes the signals received using the first communication resources 1422 on (at least) the basis that they include the control information. Accordingly, the infrastructure equipment 270 receives the scheduling request 1464 and acknowledgment information 1462.

Accordingly, embodiments of the present technique can provide methods for transmitting and receiving control information in the case that the selected uplink communication resources for the transmission of the control information overlap in time with allocated downlink communication resources.

In some embodiments, the communications device 270 may be allocated downlink communication resources for the transmission of downlink data and uplink communication resources for the transmission of acknowledgement information related to the downlink data.

However, in accordance with techniques disclosed herein, or for any other reasons, the communications device 270 may refrain from using the allocated downlink communication resources, for example due to an intra-UE HD-FDD collision.

In accordance with embodiments of the present technique, in such circumstances, the communications device nevertheless transmits a negative acknowledgement using the allocated uplink communication resources. The negative acknowledgement indicates that the downlink data was not correctly received and decoded by the communications device 270.

Figure 15:
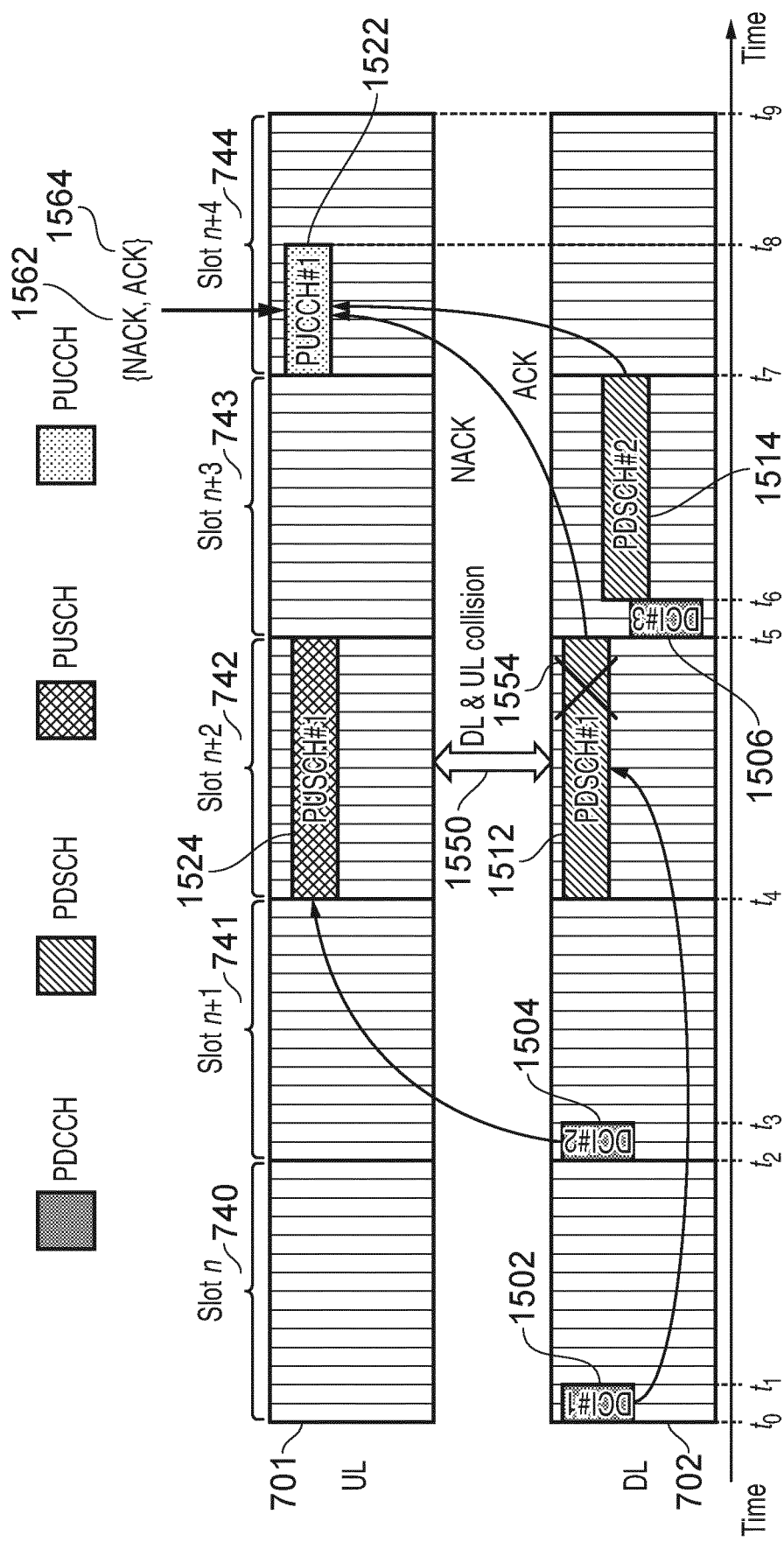
FIG. 15 illustrates an example technique for transmitting acknowledgement information in accordance with embodiments of the present technique.

An example of this is shown in FIG. 15.

Specifically, FIG. 15 illustrates an example technique for transmitting acknowledgement information in accordance with embodiments of the present technique. Many of the features shown in FIG. 15 correspond to features shown in FIG. 7. These are indicated with like reference numerals, and their description will not be repeated, for conciseness.

In FIG. 15, first downlink communication resources 1512 and first uplink communication resources 1522 are allocated by first indication 1502 for the transmission of data and associated acknowledgement information, respectively. Second uplink communication resources 1524 are allocated for the transmission of uplink data by second indication 1504.

FIG. 15 shows intra-UE HD-FDD collision 1550 arising as a result of the overlap in time, from time t4 to time t5, of the allocated first uplink communication resources 1512 and the allocated second uplink communication resources 1524.

In accordance with a prioritisation scheme and/or other rules (such as those described elsewhere herein), the communications device 270 refrains from receiving and decoding signals transmitted using the first downlink communication resources 1512, as indicated by the 'X' 1554. For example, the first downlink communication resources 1512 may be determined to have a lower priority than the second uplink communication resources 1524 because the allocation of the second uplink communication resources 1524 (i.e. the second DCI 1504) was received after the allocation of the first downlink communication resources 1512 (i.e. the first DCI 1502).

Nevertheless, in accordance with embodiments of the present technique, the communications device 270 transmits acknowledgement information 1562 indicating that no data was successfully received and decoded using the first downlink communication resources 1512.

The acknowledgement information 1562 is transmitted using the first uplink communication resources 1522.

Accordingly, the infrastructure equipment 272 is able to determine that the communications device 270 correctly received and decoded the first indication 1502 and that no data was successfully received and decoded using the first downlink communication resources 1512.

Alternatively, in accordance with some embodiments, in a scenario such as that illustrated in FIG. 15, the first uplink communication resources 1522 are also not used (i.e. no acknowledgement information is transmitted), thereby reducing power consumption of the communications device 270 and interference within the cell.

In some embodiments and as illustrated in the example of FIG. 15, the acknowledgement information 1562 is transmitted using the first uplink communication resources 1522, and the first uplink communication resources 1522 are also used for transmitting second acknowledgement information 1564.

The second acknowledgment information 1564 may indicate an acknowledgement status of other downlink data, such as second downlink data transmitted using second downlink communication resources 1514. Accordingly, less communication resources may be used to transmit acknowledgement information associated with data transmitted using both the first downlink communication resources 1512 and the second downlink communication resources 1514.

In some embodiments, the infrastructure equipment 272 determines that the second uplink communication resources 1524 and first downlink communication resources 1512 result in the intra-UE HD-FDD collision 1550 for the communications device 270.

In response, the infrastructure equipment allocates the second downlink communication resources 1514 for the transmission of data to the communications device 270, by means of a third indication 1506. The third indication 1506 also allocates uplink communication resources for the transmission of acknowledgment information associated with the data transmitted using the second downlink communication resources 1514. In response to determining that the communications device 270 will not attempt to receive and decode the data transmitted using the first downlink communication resources 1512, as a result of the intra-UE HD-FDD collision 1550, the infrastructure equipment 272 allocates, as uplink communication resources for the transmission of acknowledgment information associated with the data transmitted using the second downlink communication resources 1514, the first uplink communication resources 1522.

Accordingly, as described above, both first acknowledgement information 1562 and second acknowledgement information 1564 are transmitted by the communications device 270 (and received by the infrastructure equipment 272) using the first uplink communication resources 1522. In the example of FIG. 15, the second acknowledgement information 1564 indicates 'ACK', i.e. that the downlink data transmitted using the second downlink communication resources 1514 was correctly received and decoded by the communications device 270.

Embodiments of the present technique also provide methods for infrastructure equipment. As described above, in accordance with some embodiments of the present technique, the infrastructure equipment performs decoding in a predetermined manner as described in response to detecting an actual or potential intra-UE HD-FDD collision.

In accordance with embodiments of the present technique, the infrastructure equipment transmits one or more indications to the communications device 270 to indicate how an intra-UE HD-FDD collision is to be resolved. Examples of such indications include explicit priority indications associated with communication resources and the data decode indication, as described above. The explicit priority indication may be transmitted together with an indication of the allocation of the communication resources.

Above have been described various techniques which may be carried out in response to a detection of an intra-UE HD-FDD collision, addressing the determination of priorities associated with communication resources and with the subsequent behaviour of the communications device in response to identifying the collision. Which (if any) of these are applicable and to be used by a communications device may be indicated by appropriate signalling transmitted by the infrastructure equipment. The present disclosure is not limited to any particular combinations of techniques. For example, a determination as to which of two conflicting communication resources are to be selected may be initially based on explicit indicators received from the infrastructure equipment. If one or both of these has not been received, or both have been received and indicate the same priority level, then the determination may be made on one or more further factors. The further factors may include the manner of allocation (semi-persistent or dynamic), the times of allocation (e.g. which downlink control information allocating the resources was received first), the nature of the communication resources (e.g. on a control channel or on a shared channel, or on a random access channel, uplink or downlink), and/or the intended use of the communication resources (transmission of user data, transmission of control information).

In addition, there has been disclosed herein techniques applicable in the event that the communications device determines that certain allocated or selected communication resources are not to be used. In some embodiments, the determination is made in response to identifying an intra-UE HD-FDD collision involving the communication resources. However, the present disclosure is not so limited and these techniques may be applied when the determination that certain allocated or selected communication resources are not to be used for any other reason.

Figure 16:
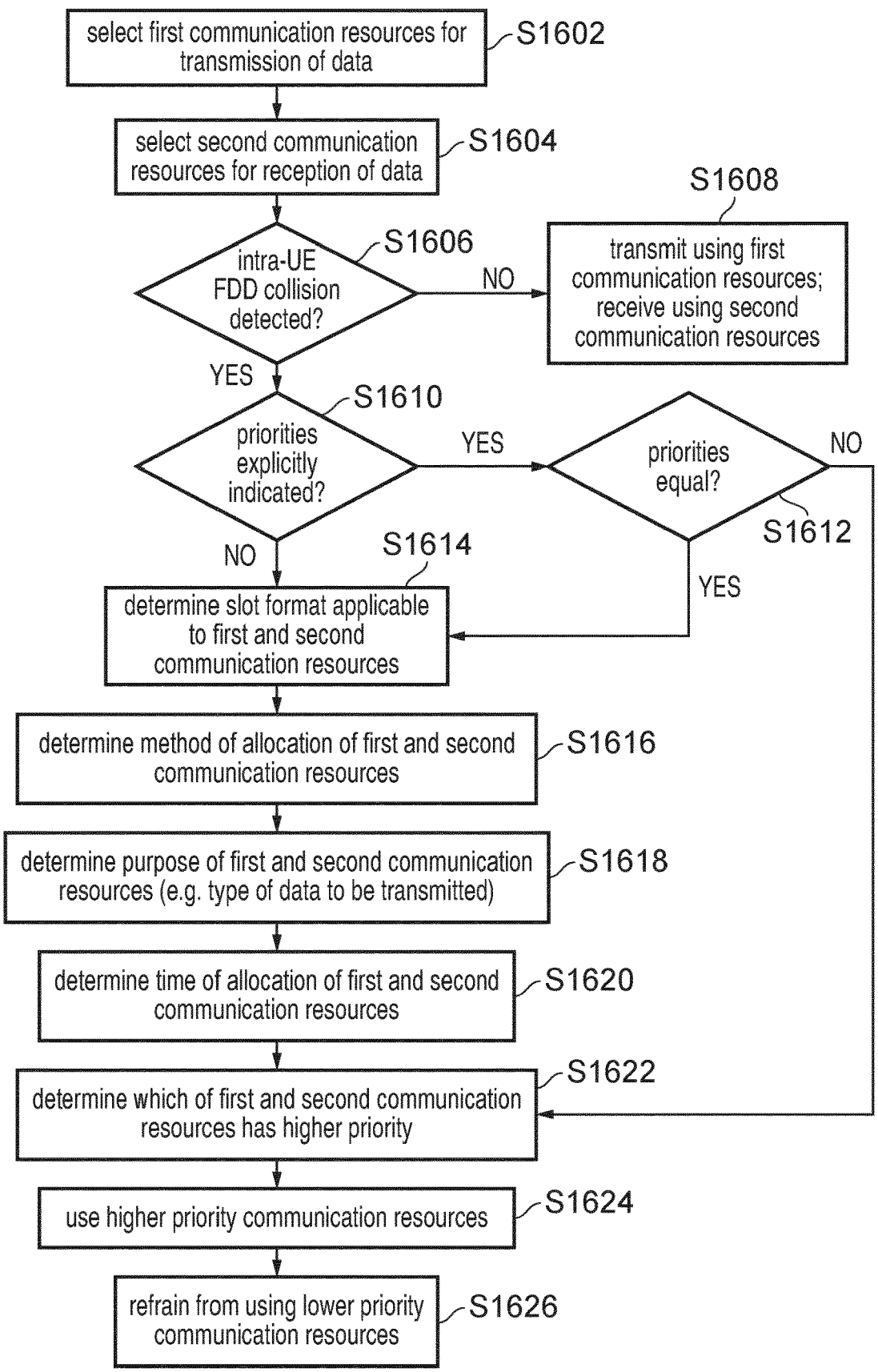
FIG. 16 is a process flow chart for an example process which may be carried out by the communications device 270 in accordance with embodiments of the present technique.

FIG. 16 is a process flow chart for an example process which may be carried out by the communications device 270 in accordance with embodiments of the present technique.

The process starts at step S1602 in which the communications device 270 selects first communication resources for transmitting data to the infrastructure equipment 272. The data may be user data or control information. The selection may be autonomous (e.g. on a random access channel, or using one of a plurality of statically or semi-statically allocated communication resources) or based on an allocation of the communication resources by the infrastructure equipment, such as by means of a dynamic grant indicated by a downlink control information.

At step S1604, the communications device 270 selects second communication resources for receiving data, transmitted by the infrastructure equipment 272. The communication resources may have been dynamically indicated as being allocated (e.g. by means of a DCI) or statically or semi-statically allocated (e.g. as part of a PDCCH monitoring window). In some embodiments, the selection of the second communication resources at step S1604 is performed even though the communications device 270 does not know whether the infrastructure equipment 272 will transmit any data to the communications device 270 using the selected second communication resources.

The order of steps S1602 and S1604 may be reversed.

At step S1606, the communications device 270 determines whether an intra-UE HD-FDD collision arises based on the first and second communication resources. In other words, the communications device identifies an intra-UE HD-FDD collision if the predetermined criteria are satisfied. For example, an intra-UE HD-FDD collision may arise if the first and second communication resources overlap in time. As described above, in some embodiments, a collision may arise if the communications device 270 is not able to switch between uplink and downlink transmission (or vice versa) within a time period separating the first and second communication resources.

If, at step S1606, no intra-UE HD-FDD collision is identified, then control passes to step S1608. In step S1608, the communications device 270 controls its transmitter and receiver to, respectively, transmit and receive signals using the first and second communication resources. The communications device 270 may further control its receiver and/or controller to decode the received signals and process the decoded data, which may be in accordance with conventional techniques.

If, at step S1606 an intra-UE HD-FDD collision is identified, the control passes to step S1610.

At step S1610, the communications device 270 determines whether it has received explicit indications of priorities which indicate priorities associated with the first and second communication resources. For example, an indication may be included within a DCI which allocates the communication resources. The priority indication may be explicitly associated with third communication resources but may nevertheless indicate a priority associated with the first or second communication resources. For example, a DCI allocating uplink communication resources on a shared channel (third communication resources) may include an indicator of the priority of these uplink communication resources. The DCI may also implicitly or explicitly allocate downlink communication resources (which may be the second communication resources) for the transmission of HARQ-ACK acknowledgement information.

In some embodiments of the present technique, the priority of the second communication resources may be equal to the priority of the third communication resources.

If it is determined at step S1610 that the communications device 270 has received indications of priorities for both the first and second communication resources, then control passes to step S1612.

At step S1612, it is determined whether the priorities associated with the first and second communication resources are equal. If they are, then control passes to step S1614. Otherwise, control passes to step S1622.

If it is determined at step S1610 that the communications device 270 has not received indications of priorities for both the first and second communication resources, then control passes to step S1614.

At step S1614, the communications device 270 determines whether an indication of an orthogonal frequency division multiplexing (OFDM) slot format has been received in respect of both the first and second communication resources (or, in some embodiments, a portion thereof). An example of such an indication may be signalling which is conventionally used in a time division duplexing (TDD) system to indicate whether a given OFDM slot period is to be used for uplink or downlink communication, such as a slot format indicator (SFI) as specified in 3GPP Release 15. If such an indication has been received in respect of each of the first and second communication resources, then the communications device 270 may determine a relative priority of the first and second communication resources, based on the indications. This determination may be in accordance with one or more techniques disclosed in the co-pending patent application [5]. Control passes to step S1622.

If such an indication is not received in respect of each of the first and second communication resources or, based on the indications, the communications device 270 is unable to determine a relative priority of the first and second communication resources based on the indications, then control passes to step S1616.

In step S1616, the communications device 270 determines a method of selection associated with each of the first and second communication resources. For example, the method of selection may be one of:
- explicitly dynamically allocated (e.g. by means of a dynamic grant);
- implicitly dynamically allocated (e.g. where other resources for the transmission of user data are allocated explicitly, and thereby the selected communication resources are implicitly allocated for the transmission of acknowledgement information associated with the user data);
- semi-persistently allocated (e.g. by means of a configured grant); or
- semi-statically allocated by means of RRC signalling.

The selection may be responsive to an allocation by the infrastructure equipment, or at least partially autonomously selected by the communications device 270. Examples of selections which are at least partially autonomous include selections of resources on a random access channel (such as a physical random access channel, PRACH) or the selection of resources from a pool of periodic resources, such as selection from a sequence of resources allocated by means of a configured grant or semi-persistent scheduling.

After step S1616, the process continues with step S1618.

At Step S1618, the communications device 270 determines a purpose of the first and second communication resources. For example, the purpose may be for the transmission of user data or control information (which may include acknowledgement information, SR, CSI, RRC connection request and/or downlink control information). After step S1618, the process continues with step S1620.

At Step S1620, the communications device 270 determines a time of allocation if the selection of one or both of the first and second communication resources was in response to an allocation of the communication resources by the infrastructure equipment. The time of allocation may correspond, for example, to a time at which a DCI allocating the communication resources was received.

After step S1620, the process continues with step S1622.

At step S1622, the communications device 270 determines a relative priority of the first and second communication resources, based on the outcome of the determination(s) made in at least one of steps S1614, S1616, S1618, S1620. The process continues with step S1624.

At step S1624, the communications device 270 controls its receiver or transmitter to receive or transmit signals using whichever of the first and second communication resources has the higher relative priority.

At step S1626, the communications device 270 refrains from controlling its receiver or transmitter to receive or transmit signals using whichever of the first and second communication resources has the lower relative priority and the process ends.

In some embodiments, one or more of the steps S1614, S1616, S1618, S1620 may be omitted, or performed in a different order. In some embodiments, the omission of one or more steps may be in response to a determination (not shown in FIG. 16) that the communications device 270 is able to determine a relative priority of the first and second communication resources based on the outcome of the determination(s) made in the completed step(s). For example, in some embodiments, step S1620 is omitted if a determination is made based on the outcome of one or more of steps S1614, S1616 and S1618.

In some embodiments, the performance of one or more subsequent steps may be dependent on the outcome(s) of one or more earlier steps. For example, in some embodiments, step S1620 may be performed only if it is determined that the method of allocation of the uplink resources is by means of a dynamic grant, and the downlink resources are allocated for the transmission of user data.

The process of FIG. 16 may be modified by the addition, omission, or re-ordering of the process steps. In some embodiments, the process of FIG. 16 may be combined with one or more other techniques disclosed herein.

References herein to an allocation of communication resources may, in some embodiments not be limited to the case where the communication resources are explicitly allocated. Accordingly, in some embodiments, communication resources are selected e.g. from a static pool of resources, by the communications device 270 in accordance with predetermined or preconfigured rules.

In some embodiments of the present technique, the priority of one or both of the communication resources which are overlapping may be determined by reference to one or more indications transmitted within a group-common downlink control information (GC-DCI).

For example, the selection of which of the overlapping communication resources is to be used, and which the communications device refrains from using, may be based on uplink and downlink indicators, as disclosed in co-pending application [5].

Accordingly, embodiments of the present technique can provide a method of operating a communications device in a wireless communications network, the method comprising: selecting first uplink communication resources of an uplink of a wireless access interface for transmitting uplink data to an infrastructure equipment of the wireless communications network, selecting second downlink communication resources of a downlink of the wireless access interface for receiving downlink data transmitted by the infrastructure equipment of the wireless communications network, detecting a collision whereby, in accordance with the capabilities of the communications device, the communications device cannot both transmit signals using the first uplink communication resources and receive and decode signals transmitted using the second downlink communication resources, in response to detecting the collision, determining whether the second downlink communication resources are associated with a priority which is higher than a priority associated with the first uplink communication resources, and if the second downlink communication resources are associated with a priority which is higher than the priority associated with the first communication resources, receiving the downlink data using the second downlink communication resources, and refraining from transmitting the uplink data using the first uplink communication resources.

There has also been described a method of operating an infrastructure equipment in a wireless communications network, the method comprising transmitting a first allocation indication indicating an allocation of first communication resources of a wireless access interface for transmitting uplink data by a communications device to the infrastructure equipment, determining that downlink data is to be transmitted to the communications device, the downlink data associated with a latency requirement, and transmitting a second allocation indication indicating an allocation of second communication resources for the transmission of the downlink data to the communications device in accordance with the latency requirement, wherein the first uplink communication resources and the second downlink communication resources are such that, in accordance with the capabilities of the communications device, the communications device cannot both transmit signals using the first uplink communication resources and receive and decode signals transmitted using the second downlink communication resources.

There has also been described a method of operating an infrastructure equipment in a wireless communications network, the method comprising transmitting a first allocation indication indicating an allocation of first communication resources of a wireless access interface for transmitting downlink data to a communications device, determining that uplink data is to be transmitted to the communications device, the downlink data associated with a latency requirement, and transmitting a second allocation indication indicating an allocation of second communication resources for the transmission of the uplink data by the communications device in accordance with the latency requirement, wherein the first communication resources and the second communication resources are such that, in accordance with the capabilities of the communications device, the communications device cannot both transmit signals using the second communication resources and receive and decode signals transmitted using the first communication resources.

Corresponding communications devices, infrastructure equipment and circuitry for a communications device and circuitry for infrastructure equipment have also been described.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to URLLC/IIoT devices or other low latency communications devices, but can be applied more generally, for example in respect of any type of communications device operating with a wireless link to the communication network.

It will further be appreciated that the principles described herein are applicable not only to LTE-based or 5G/NR-based wireless telecommunications systems, but are applicable for any type of wireless telecommunications system that supports frequency division duplexing.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a communications device in a wireless communications network, the method comprising: selecting first communication resources of an uplink of a wireless access interface for transmitting uplink data to an infrastructure equipment of the wireless communications network, selecting second communication resources of a downlink of the wireless access interface for receiving downlink data transmitted by the infrastructure equipment of the wireless communications network, detecting a collision whereby, in accordance with the capabilities of the communications device, the communications device cannot both transmit signals using the first uplink communication resources and receive and decode signals transmitted using the second downlink communication resources, in response to detecting the collision, determining whether the second downlink communication resources are associated with a priority which is higher than a priority associated with the first uplink communication resources, and if the second downlink communication resources are associated with a priority which is higher than the priority associated with the first uplink communication resources, receiving the downlink data using the second downlink communication resources, and refraining from transmitting the uplink data using the first uplink communication resources.

Paragraph 2. A method according to paragraph 1, wherein the detecting the collision comprises determining that the first uplink communication resources and the second downlink communication resources overlap at least partially in time.

Paragraph 3. A method according to paragraph 1 or paragraph 2, wherein the detecting the collision comprises determining that a time period between an end of one of the first uplink communication resources and the second downlink communication resources, and a start of the other of the first uplink communication resources and the second downlink communication resources is shorter than a time required for the communications device to switch between a transmitting mode of operation and a receiving mode of operation.

Paragraph 4. A method according to any of paragraphs 1 to 3, the method comprising if the second downlink communication resources are not associated with a priority which is higher than the priority associated with the first uplink communication resources, transmitting the uplink data to the infrastructure equipment using the first uplink communication resources and refraining from receiving the downlink data using the second downlink communication resources.

Paragraph 5. A method according to any of paragraphs 1 to 4, wherein when the first uplink communication resources are selected from the communication resources of a random access channel, the second downlink communication resources are associated with a priority which is higher than a priority associated with the first uplink communication resources.

Paragraph 6. A method according to any of paragraphs 1 to 5, the method comprising: receiving a first priority indication associated with the first uplink communication resources, and receiving a second priority indication associated with the second downlink communication resources.

Paragraph 7. A method according to paragraph 6, wherein according to the first priority indication and the second priority indication, the priority associated with the first uplink communication resources is different from the priority associated with the second downlink communication resources, and the determining whether the first uplink communication resources are associated with a priority which is higher than a priority associated with the second downlink communication resources is based on the first priority indication and the second priority indication.

Paragraph 8. A method according to paragraph 6, the method comprising determining that the priority associated with the first uplink communication resources is equal to the priority associated with the second downlink communication resources.

Paragraph 9. A method according to any of paragraphs 1 to 5, the method comprising determining that no first priority indication associated with the first uplink communication resources has been received and/or that no second priority indication associated with the second downlink communication resources has been received.

Paragraph 10. A method according to any of paragraphs 1 to 9, the method comprising determining that no slot format indicator has been received for one or both of the first uplink communication resources and the second downlink communication resources.

Paragraph 11. A method according to any of paragraphs 1 to 10, the method comprising receiving a first allocation indication indicating an allocation of the first uplink communication resources, and receiving a second allocation indication indicating an allocation of the second downlink communication resources.

Paragraph 12. A method according to paragraph 11, wherein the determining whether the first uplink communication resources are associated with a priority which is higher than a priority associated with the second downlink communication resources is based on one or more of a type of the first allocation indication and a type of the second allocation indication.

Paragraph 13. A method according to paragraph 12, wherein the type of the first allocation indication is one of a configured grant allocating a plurality of periodic instances of communication resources including the first uplink communication resources and a dynamic grant, and when the type of the first allocation indication is a configured grant, the second downlink communication resources are associated with a priority which is higher than a priority associated with the first uplink communication resources.

Paragraph 14. A method according to any of paragraphs 1 to 13, wherein the determining whether the first uplink communication resources are associated with a priority which is higher than a priority associated with the second downlink communication resources is based on one or more of a type of the uplink data, and a type of the downlink data.

Paragraph 15. A method according to paragraph 14, wherein the type of the downlink data is one of user data and control information.

Paragraph 16. A method according to paragraph 15, wherein when the type of the downlink data is user data, the second downlink communication resources are associated with a priority which is higher than a priority associated with the first uplink communication resources.

Paragraph 17. A method according to any of paragraphs 14 to 16, wherein the type of the uplink data is one of user data and uplink control information.

Paragraph 18. A method according to paragraph 17, wherein when the type of the uplink data is uplink control information, determining whether the first uplink communication resources are associated with a priority which is higher than a priority associated with the second downlink communication resources is based on an uplink control information subtype of the uplink control information.

Paragraph 19. A method according to paragraph 18, wherein the uplink control information subtype is one of acknowledgement information, scheduling request and channel state information.

Paragraph 20. A method according to paragraph 19, wherein when the uplink control information subtype is one of acknowledgement information and channel state information, the first uplink communication resources are associated with a priority which is higher than the priority associated with the second downlink communication resources.

Paragraph 21. A method according to any of paragraphs 4 to 20, wherein when the first indication is received before the second indication, the second downlink communication resources are associated with a priority which is higher than a priority associated with the first uplink communication resources.

Paragraph 22. A method according to any of paragraphs 1 to 21, wherein refraining from transmitting the uplink data using the first uplink communication resources comprises discarding the uplink data without transmitting it.

Paragraph 23. A method according to any of paragraphs 1 to 22, wherein the downlink data comprises first user data, and the second downlink communication resources are associated with a priority which is higher than a priority associated with the first uplink communication resources, the method comprising: receiving an allocation indication indicating the allocation of the second downlink communication resources and third uplink communication resources.

Paragraph 24. A method according to paragraph 23, the method comprising transmitting acknowledgement information associated with the first user data using the third uplink communication resources Paragraph 25. A method according to paragraph 23 or paragraph 24 wherein the uplink data comprises an indication of an acknowledgement status of second user data, the method comprising transmitting acknowledgement information based on the acknowledgement status of the second user data using the third uplink communication resources.

Paragraph 26. A method according to paragraph 23 or paragraph 24, wherein the uplink data comprises first control information, the method comprising transmitting the first control information using the third uplink communication resources.

Paragraph 27. A method according to paragraph 26, wherein the first control information comprises a request for an allocation of uplink communication resources for transmitting data.

Paragraph 28. A method according to any of paragraphs 1 to 21, wherein the downlink data is user data, the method comprising if the second downlink communication resources are not associated with a priority which is higher than a priority associated with the first uplink communication resources, transmitting acknowledgement information indicating that the user data was not received and decoded correctly.

Paragraph 29. A method according to paragraph 28, the method comprising receiving an allocation indication indicating the allocation of the second downlink communication resources and third uplink communication resources, the third uplink communication resources allocated for transmitting acknowledgment information associated with the user data, wherein the acknowledgement information is transmitted using the third uplink communication resources.

Paragraph 30. A method according to any of paragraphs 1 to 21, wherein the second downlink communication resources are associated with a priority which is higher than a priority associated with the first uplink communication resources, and the uplink data comprises an indication of an acknowledgement status of second downlink data, the method comprising determining that fourth communication resources are allocated for receiving the second downlink data from the infrastructure equipment, and in response to determining that the second downlink communication resources are associated with a priority which is higher than a priority associated with the first uplink communication resources, refraining from receiving the second user data transmitted using the fourth communication resources.

Paragraph 31. A method according to paragraph 30, wherein the detecting the collision is before the start of the fourth communication resources and the refraining from receiving the second user data transmitted using the fourth communication resources is in response to the detecting, before the start of the fourth communication resources, the collision.

Paragraph 32. A method according to any of paragraphs 1 to 31, wherein the communications device is configured to operate as a half-duplex frequency division duplex device.

33. A method of operating an infrastructure equipment in a wireless communications network, the method comprising transmitting a first allocation indication indicating an allocation of first uplink communication resources of a wireless access interface for transmitting uplink data by a communications device to the infrastructure equipment, determining that downlink data is to be transmitted to the communications device, the downlink data associated with a latency requirement, and transmitting a second allocation indication indicating an allocation of second downlink communication resources for the transmission of the downlink data to the communications device in accordance with the latency requirement, wherein the first uplink communication resources and the second downlink communication resources are such that, in accordance with the capabilities of the communications device, the communications device cannot both transmit signals using the first uplink communication resources and receive and decode signals transmitted using the second downlink communication resources.

Paragraph 34. A method according to paragraph 33, the method comprising receiving acknowledgement information transmitted by the communications device, the acknowledgement information indicating that the communications device correctly received and decoded the downlink data.

Paragraph 35. A method according to paragraph 33 or paragraph 34, wherein the uplink data is second acknowledgement information.

Paragraph 36. A method according to paragraph 35, wherein the second allocation indication indicates an allocation of third uplink communication resources for the transmission by the communications device of acknowledgement information associated with the second data, the method comprising: receiving the uplink data and the acknowledgement information associated with the second data, the uplink data and the acknowledgement information associated with the second data transmitted by the communications device using the third uplink communication resources.

Paragraph 37. A method of operating an infrastructure equipment in a wireless communications network, the method comprising transmitting a first allocation indication indicating an allocation of first downlink communication resources of a wireless access interface for transmitting downlink data to a communications device, determining that uplink data is to be transmitted to the communications device, the downlink data associated with a latency requirement, and transmitting a second allocation indication indicating an allocation of second uplink communication resources for the transmission of the uplink data by the communications device in accordance with the latency requirement, wherein the first downlink communication resources and the second uplink communication resources are such that, in accordance with the capabilities of the communications device, the communications device cannot both transmit signals using the second uplink communication resources and receive and decode signals transmitted using the first downlink communication resources.

Paragraph 38. A method according to paragraph 37, the method comprising receiving the uplink data transmitted using the second uplink communication resources by the communications device, and receiving acknowledgement information transmitted by the communications device, the acknowledgement information indicating that the communications device correctly received and decoded the first allocation indication but did not correctly receive and decode the downlink data.

Paragraph 39. A method according to paragraph 37 or paragraph 38, the method comprising determining that in accordance with the capabilities of the communications device, the communications device cannot both transmit signals using the second uplink communication resources and receive and decode signals transmitted using the first downlink communication resources, determining that the uplink data is associated with a higher priority than the downlink data, and in response to the determining that the communications device cannot both transmit signals using the second uplink communication resources and receive and decode signals transmitted using the first downlink communication resources and the determining that the uplink data is associated with a higher priority than the downlink data, transmitting a third allocation indication, indicating an allocation of the first downlink communication resources of the wireless access interface for transmitting other downlink data to another communications device.

Paragraph 40. A method according to any of paragraphs 33 to 39, wherein the communications device is configured to operate as a half-duplex frequency division duplex device.

Paragraph 41. A communications device for operating in a wireless communications network, the communications device comprising a transmitter configured to transmit signals via a wireless access interface provided by an infrastructure equipment in a cell of the wireless communications network, a receiver configured to receive signals via the wireless access interface, and a controller configured to control the transmitter and the receiver so that the communications device is operable: to select first uplink communication resources of an uplink of the wireless access interface for transmitting uplink data to the infrastructure equipment, to select second downlink communication resources of a downlink of the wireless access interface for receiving downlink data transmitted by the infrastructure equipment, to detect a collision whereby, in accordance with the capabilities of the communications device, the communications device cannot both transmit signals using the first uplink communication resources and receive and decode signals transmitted using the second downlink communication resources, in response to detecting the collision, to determine whether the second downlink communication resources are associated with a priority which is higher than a priority associated with the first uplink communication resources, and if the second downlink communication resources are associated with a priority which is higher than the priority associated with the first uplink communication resources, to control the receiver to receive the downlink data using the second downlink communication resources, and to refrain from controlling the transmitter to transmit the uplink data using the first uplink communication resources.

Paragraph 42. Circuitry for a communications device for operating in a wireless communications network, the circuitry comprising transmitter circuitry configured to transmit signals via a wireless access interface provided by an infrastructure equipment in a cell of the wireless communications network, receiver circuitry configured to receive signals via the wireless access interface, and controller circuitry configured to control the transmitter circuitry and the receiver circuitry so that the communications device is operable: to select first uplink communication resources of an uplink of the wireless access interface for transmitting uplink data to the infrastructure equipment, to select second downlink communication resources of a downlink of the wireless access interface for receiving downlink data transmitted by the infrastructure equipment, to detect a collision whereby, in accordance with the capabilities of the communications device, the communications device cannot both transmit signals using the first uplink communication resources and receive and decode signals transmitted using the second downlink communication resources, in response to detecting the collision, to determine whether the second downlink communication resources are associated with a priority which is higher than a priority associated with the first uplink communication resources, and if the second downlink communication resources are associated with a priority which is higher than the priority associated with the first uplink communication resources, to control the receiver to receive the downlink data using the second downlink communication resources, and to refrain from controlling the transmitter to transmit the uplink data using the first uplink communication resources.

Paragraph 43. Infrastructure equipment for use in a wireless communications network, the infrastructure equipment providing a wireless access interface for communicating with a communications device in a cell, the infrastructure equipment comprising a transmitter configured to transmit signals to the communications device via the wireless access interface, a receiver configured to receive signals from the communications device, and a controller configured to control the transmitter and the receiver so that the infrastructure equipment is operable to transmit a first allocation indication indicating an allocation of first uplink communication resources of a wireless access interface for transmitting uplink data by a communications device to the infrastructure equipment, to determine that downlink data is to be transmitted to the communications device, the downlink data associated with a latency requirement, and to transmit a second allocation indication indicating an allocation of second downlink communication resources for the transmission of the downlink data to the communications device in accordance with the latency requirement, wherein the first uplink communication resources and the second downlink communication resources are such that, in accordance with the capabilities of the communications device, the communications device cannot both transmit signals using the first uplink communication resources and receive and decode signals transmitted using the second downlink communication resources.

Paragraph 44. Circuitry for an infrastructure equipment for use in a wireless communications network, the infrastructure equipment providing a wireless access interface for communicating with a communications device in a cell, the circuitry comprising transmitter circuitry configured to transmit signals to the communications device via the wireless access interface, receiver circuitry configured to receive signals from the communications device, and controller circuitry configured to control the transmitter circuitry and the receiver circuitry so that the infrastructure equipment is operable to transmit a first allocation indication indicating an allocation of first uplink communication resources of a wireless access interface for transmitting uplink data by a communications device to the infrastructure equipment, to determine that downlink data is to be transmitted to the communications device, the downlink data associated with a latency requirement, and to transmit a second allocation indication indicating an allocation of second downlink communication resources for the transmission of the downlink data to the communications device in accordance with the latency requirement, wherein the first uplink communication resources and the second downlink communication resources are such that, in accordance with the capabilities of the communications device, the communications device cannot both transmit signals using the first uplink communication resources and receive and decode signals transmitted using the second downlink communication resources.

Paragraph 45. Infrastructure equipment for use in a wireless communications network, the infrastructure equipment providing a wireless access interface for communicating with a communications device in a cell, the circuitry comprising a transmitter configured to transmit signals to the communications device via the wireless access interface, a receiver configured to receive signals from the communications device, and a circuitry configured to control the transmitter and the receiver so that the infrastructure equipment is operable to transmit a first allocation indication indicating an allocation of first downlink communication resources of a wireless access interface for transmitting downlink data to a communications device, to determine that uplink data is to be transmitted to the communications device, the downlink data associated with a latency requirement, and to transmit a second allocation indication indicating an allocation of second uplink communication resources for the transmission of the uplink data by the communications device in accordance with the latency requirement, wherein the first downlink communication resources and the second uplink communication resources are such that, in accordance with the capabilities of the communications device, the communications device cannot both transmit signals using the second uplink communication resources and receive and decode signals transmitted using the first downlink communication resources.

Paragraph 46. Circuitry for an infrastructure equipment for use in a wireless communications network, the infrastructure equipment providing a wireless access interface for communicating with a communications device in a cell, the circuitry comprising transmitter circuitry configured to transmit signals to the communications device via the wireless access interface, receiver circuitry configured to receive signals from the communications device, and controller circuitry configured to control the transmitter circuitry and the receiver circuitry so that the infrastructure equipment is operable to transmit a first allocation indication indicating an allocation of first downlink communication resources of a wireless access interface for transmitting downlink data to a communications device, to determine that uplink data is to be transmitted to the communications device, the downlink data associated with a latency requirement, and to transmit a second allocation indication indicating an allocation of second uplink communication resources for the transmission of the uplink data by the communications device in accordance with the latency requirement, wherein the first downlink communication resources and the second uplink communication resources are such that, in accordance with the capabilities of the communications device, the communications device cannot both transmit signals using the second uplink communication resources and receive and decode signals transmitted using the first downlink communication resources. Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] RP-182090, "Revised SID: Study on NR Industrial Internet of Things (IoT)," 3GPP RAN #81.
[2] Holma H. and Toskala A, "LTE for UMTS OFDMA and SC-FDMA based radio access", John Wiley and Sons, 2009.
[3] 3GPP TR 38.913 "Study on scenarios and requirements for next generation access technologies"
[4] 3GPP document RP-193238, "New SID on support of reduced capability NR devices", Ericsson, RAN #86
[5] Co-pending European Patent Application EP20158107.1

What is claimed is:
1. A method of operating a communications device in a wireless communications network, the method comprising:
selecting first communication resources of an uplink of a wireless access interface for transmitting uplink data to an infrastructure equipment of the wireless communications network,
selecting second communication resources of a downlink of the wireless access interface for receiving downlink data transmitted by the infrastructure equipment of the wireless communications network,
detecting a collision whereby, in accordance with the capabilities of the communications device, the communications device cannot both transmit signals using the first uplink communication resources and receive and decode signals transmitted using the second downlink communication resources,
receiving a first priority indication associated with the first uplink communication resources,
receiving a second priority indication associated with the second downlink communication resources,
in response to detecting the collision, determining whether the second downlink communication resources are associated with a priority which is higher than a priority associated with the first uplink communication resources, and
if the second downlink communication resources are associated with the priority which is higher than the priority associated with the first uplink communication resources, receiving the downlink data using the second downlink communication resources and refraining from transmitting the uplink data using the first uplink communication resources.
2. The method according to claim 1, wherein the detecting the collision comprises determining that the first uplink communication resources and the second downlink communication resources overlap at least partially in time.

3. The method according to claim 1, wherein the detecting the collision comprises determining that a time period between an end of one of the first uplink communication resources and the second downlink communication resources and a start of the other of the first uplink communication resources and the second downlink communication resources is shorter than a time required for the communications device to switch between a transmitting mode of operation and a receiving mode of operation.

4. The method according to claim 1, the method comprising
if the second downlink communication resources are not associated with a priority which is higher than the priority associated with the first uplink communication resources, transmitting the uplink data to the infrastructure equipment using the first uplink communication resources and refraining from receiving the downlink data using the second downlink communication resources.

5. The method according to claim 1, wherein when the first uplink communication resources are selected from the communication resources of a random access channel, the second downlink communication resources are associated with a priority which is higher than a priority associated with the first uplink communication resources.

6. The method according to claim 1, wherein
according to the first priority indication and the second priority indication, the priority associated with the first uplink communication resources is different from the priority associated with the second downlink communication resources, and
the determining whether the first uplink communication resources are associated with a priority which is higher than a priority associated with the second downlink communication resources is based on the first priority indication and the second priority indication.

7. The method according to claim 1, the method comprising determining that the priority associated with the first uplink communication resources is equal to the priority associated with the second downlink communication resources.

8. The method according to claim 1, the method comprising determining that no first priority indication associated with the first uplink communication resources has been received and/or that no second priority indication associated with the second downlink communication resources has been received.

9. The method according to claim 1, the method comprising determining that no slot format indicator has been received for one or both of the first uplink communication resources and the second downlink communication resources.

10. The method according to claim 1, the method comprising:
receiving a first allocation indication indicating an allocation of the first uplink communication resources, and
receiving a second allocation indication indicating an allocation of the second downlink communication resources.

11. The method according to claim 10, wherein the determining whether the first uplink communication resources are associated with a priority which is higher than a priority associated with the second downlink communication resources is based on one or more of a type of the first allocation indication and a type of the second allocation indication.

12. The method according to claim 11, wherein
the type of the first allocation indication is one of a configured grant allocating a plurality of periodic instances of communication resources including the first uplink communication resources and a dynamic grant, and
when the type of the first allocation indication is a configured grant, the second downlink communication resources are associated with a priority which is higher than a priority associated with the first uplink communication resources.

13. The method according to claim 1, wherein the determining whether the first uplink communication resources are associated with a priority which is higher than a priority associated with the second downlink communication resources is based on one or more of
a type of the uplink data, and
a type of the downlink data.

14. The method according to claim 13, wherein the type of the downlink data is one of user data and control information.

15. The method according to claim 14, wherein when the type of the downlink data is user data, the second downlink communication resources are associated with a priority which is higher than a priority associated with the first uplink communication resources.

16. The method according to claim 13, wherein the type of the uplink data is one of user data and uplink control information.

17. The method according to claim 4, wherein when a first indication associated with the first uplink communication resources is received before a second indication associated with the second uplink communication resources, the second downlink communication resources are associated with a priority which is higher than a priority associated with the first uplink communication resources.

18. A communications device for operating in a wireless communications network, the communications device comprising:
a transmitter configured to transmit signals via a wireless access interface provided by an infrastructure equipment in a cell of the wireless communications network,
a receiver configured to receive signals via the wireless access interface, and
a controller configured to control the transmitter and the receiver so that the communications device is operable:
to select first uplink communication resources of an uplink of the wireless access interface for transmitting uplink data to the infrastructure equipment,
to select second downlink communication resources of a downlink of the wireless access interface for receiving downlink data transmitted by the infrastructure equipment,
to receive a first priority indication associated with the first uplink communication resources,
to receive a second priority indication associated with the second downlink communication resources,
to detect a collision whereby, in accordance with the capabilities of the communications device, the communications device cannot both transmit signals using the first uplink communication resources and receive and decode signals transmitted using the second downlink communication resources, in response to detecting the collision, to determine whether the second downlink communication resources are associated with a priority which is higher than a priority associated with the first uplink communication resources, and if the second downlink communication resources are associated with a priority which is higher than the priority associated with the first uplink communication resources, to control the receiver to receive the downlink data using the second downlink communication resources, and to refrain from controlling the transmitter to transmit the uplink data using the first uplink communication resources.

19. Infrastructure equipment for use in a wireless communications network, the infrastructure equipment providing a wireless access interface for communicating with a communications device in a cell, the infrastructure equipment comprising:

a transmitter configured to transmit signals to the communications device via the wireless access interface, a receiver configured to receive signals from the communications device, and a controller configured to control the transmitter and the receiver so that the infrastructure equipment is operable:

to transmit a first allocation indication indicating an allocation of first uplink communication resources of a wireless access interface for transmitting uplink data by a communications device to the infrastructure equipment, to determine that downlink data is to be transmitted to the communications device, the downlink data associated with a latency requirement, to transmit a second allocation indication indicating an allocation of second downlink communication resources for the transmission of the downlink data to the communications device in accordance with the latency requirement, to transmit a first priority indication associated with the first uplink communication resources, and to transmit a second priority indication associated with the second downlink communication resources, wherein the first uplink communication resources and the second downlink communication resources are such that, in accordance with the capabilities of the communications device, the communications device cannot both transmit signals using the first uplink communication resources and receive and decode signals transmitted using the second downlink communication resources.

* * * * *